US012779769B2

(12) United States Patent
Singh et al.

(10) Patent No.: US 12,779,769 B2
(45) Date of Patent: Nov. 3, 2026

(54) IMPRINT LITHOGRAPHY PROCESS AND METHODS ON CURVED SURFACES

(71) Applicant: Magic Leap, Inc., Plantation, FL (US)

(72) Inventors: Vikramjit Singh, Pflugerville, TX (US); Frank Y. Xu, Austin, TX (US)

(73) Assignee: Magic Leap, Inc., Plantation, FL (US)

( * ) Notice: Subject to any disclaimer, the term of this patent is extended or adjusted under 35 U.S.C. 154(b) by 139 days.

(21) Appl. No.: 18/556,865

(22) PCT Filed: Apr. 28, 2022

(86) PCT No.: PCT/US2022/071986

§ 371 (c)(1),
(2) Date: Oct. 23, 2023

(87) PCT Pub. No.: WO2022/232819

PCT Pub. Date: Nov. 3, 2022

(65) Prior Publication Data

US 2024/0198578 A1 Jun. 20, 2024

Related U.S. Application Data

(60) Provisional application No. 63/182,522, filed on Apr. 30, 2021.

(51) Int. Cl.

*B29C 59/02* (2006.01)
*B29C 33/58* (2006.01)
(Continued)

(52) U.S. Cl.

CPC .......... *B29C 59/021* (2013.01); *B29C 59/026* (2013.01); *B29C 33/58* (2013.01);
(Continued)

(58) Field of Classification Search

CPC ..... B29C 59/021; B29C 59/026; B29C 33/58; G02B 27/0172; G02B 5/1852;
(Continued)

(56) References Cited

U.S. PATENT DOCUMENTS 4,852,988 A 8/1989 Velez
6,433,760 B1 8/2002 Vaissie
(Continued)

FOREIGN PATENT DOCUMENTS

CA 2316473 A1 1/2001
CA 2362895 A1 12/2002
(Continued)

OTHER PUBLICATIONS

Annotated bibliographic data sheet for CN 107111226 A. (Year: 2017).*

(Continued)

*Primary Examiner* — William P Fletcher, III

(74) *Attorney, Agent, or Firm* — Zi Y. Wong; Via LLP

(57) ABSTRACT

Methods for creating a pattern on a curved surface and an optical structure (e.g., curved waveguide, a lens having an antireflective feature, an optical structure of a wearable head device) are disclosed. In some embodiments, the method comprises: depositing a patterning material on a curved surface; positioning a superstrate over the patterning material, the superstrate comprising a template for creating the pattern; applying, using the patterning material, a force between the curved surface and the superstrate; curing the patterning material, wherein the cured patterning material comprises the pattern; and removing the superstrate. In some embodiments, the method comprises forming the optical structure using the pattern.

17 Claims, 21 Drawing Sheets

(51) Int. Cl.

| | |
|---|---|
| ***B29D 11/00*** | (2006.01) |
| ***B29L 11/00*** | (2006.01) |
| ***G02B 27/01*** | (2006.01) |

(52) U.S. Cl.
CPC .. *B29D 11/00326* (2013.01); *B29K 2867/003* (2013.01); *B29K 2869/00* (2013.01); *B29L 2011/0075* (2013.01); *G02B 27/0172* (2013.01)

(58) Field of Classification Search
CPC .... G02B 2027/0174; G02B 2027/0178; G03F 7/0002; B29D 11/00326; B29D 11/0073; B29K 2867/003; B29K 2869/00; B29L 2011/0075; B05D 5/02; B05D 5/06; B05D 3/12; B05D 3/067
See application file for complete search history.

(56) References Cited

U.S. PATENT DOCUMENTS

| | | | | |
|---|---|---|---|---|
| 6,491,391 | B1 | 12/2002 | Blum et al. | |
| 6,847,336 | B1 | 1/2005 | Lemelson | |
| 6,943,754 | B2 | 9/2005 | Aughey | |
| 6,977,776 | B2 | 12/2005 | Volkenandt et al. | |
| 7,347,551 | B2 | 3/2008 | Fergason et al. | |
| 7,488,294 | B2 | 2/2009 | Torch | |
| 8,092,737 | B2 | 1/2012 | Chang et al. | |
| 8,235,529 | B1 | 8/2012 | Raffle | |
| 8,611,015 | B2 | 12/2013 | Wheeler | |
| 8,638,498 | B2 | 1/2014 | Bohn et al. | |
| 8,696,113 | B2 | 4/2014 | Lewis | |
| 8,929,589 | B2 | 1/2015 | Publicover et al. | |
| 9,010,929 | B2 | 4/2015 | Lewis | |
| 9,274,338 | B2 | 3/2016 | Robbins et al. | |
| 9,292,973 | B2 | 3/2016 | Bar-zeev et al. | |
| 9,323,325 | B2 | 4/2016 | Perez et al. | |
| 9,720,505 | B2 | 8/2017 | Gribetz et al. | |
| 10,013,053 | B2 | 7/2018 | Cederlund et al. | |
| 10,025,379 | B2 | 7/2018 | Drake et al. | |
| 12,174,403 | B2 | 12/2024 | Li | |
| 2003/0030597 | A1 | 2/2003 | Geist | |
| 2004/0200368 | A1 | 10/2004 | Ogino et al. | |
| 2006/0023158 | A1 | 2/2006 | Howell et al. | |
| 2008/0138460 | A1* | 6/2008 | Heidari | B82Y 40/00 425/436 R |
| 2010/0034911 | A1* | 2/2010 | Mori | B82Y 40/00 425/89 |
| 2010/0098940 | A1* | 4/2010 | Liu | G03F 7/0002 528/33 |
| 2010/0109203 | A1* | 5/2010 | Chen | B05D 1/005 977/887 |
| 2011/0211056 | A1 | 9/2011 | Publicover et al. | |
| 2011/0213664 | A1 | 9/2011 | Osterhout | |
| 2012/0021806 | A1 | 1/2012 | Maltz | |
| 2012/0033912 | A1* | 2/2012 | Maxwell | G02B 6/1228 385/14 |
| 2013/0077147 | A1 | 3/2013 | Efimov | |
| 2013/0224636 | A1* | 8/2013 | Kobrin | G03F 1/00 430/5 |
| 2014/0110265 | A1* | 4/2014 | Fredenberg | B81C 99/0085 216/13 |
| 2014/0195918 | A1 | 7/2014 | Friedlander | |
| 2015/0024308 | A1* | 1/2015 | Chen | G03F 1/76 430/5 |
| 2015/0168731 | A1 | 6/2015 | Robbins | |
| 2016/0214281 | A1* | 7/2016 | Chen | B29C 33/40 |
| 2018/0004084 | A1* | 1/2018 | Van Brakel | G03F 7/0002 |
| 2018/0143470 | A1* | 5/2018 | Oh | G02F 1/133703 |
| 2020/0209459 | A1 | 7/2020 | Curtis et al. | |
| 2020/0271840 | A1* | 8/2020 | Klug | G02B 6/004 |
| 2020/0400951 | A1 | 12/2020 | Zhang | |
| 2021/0011305 | A1 | 1/2021 | Chang | |
| 2021/0157229 | A1* | 5/2021 | Cherala | G03F 7/0002 |
| 2022/0276419 | A1* | 9/2022 | Li | G03F 7/70483 |

FOREIGN PATENT DOCUMENTS

| | | | | | |
|---|---|---|---|---|---|
| CA | 2388766 | A1 | | 12/2003 | |
| CN | 1836179 | A | | 9/2006 | |
| CN | 107111226 | A | | 8/2017 | |
| CN | 110412684 | A | | 11/2019 | |
| JP | 2005159358 | A | | 6/2005 | |
| JP | 2012212781 | A | | 11/2012 | |
| JP | 2018503251 | A | | 2/2018 | |
| JP | 2018521350 | A | | 8/2018 | |
| JP | 2020008599 | A | | 1/2020 | |
| JP | 2021005684 | A | | 1/2021 | |
| WO | WO-2020012457 | A1 | * | 1/2020 | B29C 33/3842 |
| WO | WO-2021017077 | A1 | * | 2/2021 | B29D 11/00769 |

OTHER PUBLICATIONS

European Search Report dated Feb. 20, 2025, for EP Application No. 22796980.5, nine pages.

Jacob, R. "Eye Tracking in Advanced Interface Design", Virtual Environments and Advanced Interface Design, Oxford University Press, Inc. (Jun. 1995).

Rolland, J. et al., "High-resolution inset head-mounted display", Optical Society of America, vol. 37, No. 19, Applied Optics, (Jul. 1, 1998).

Tanriverdi, V. et al. (Apr. 2000). "Interacting With Eye Movements In Virtual Environments," Department of Electrical Engineering and Computer Science, Tufts University, Medford, MA 02155, USA, Proceedings of the SIGCHI conference on Human Factors in Computing Systems, eight pages.

Yoshida, A. et al., "Design and Applications of a High Resolution Insert Head Mounted Display", (Jun. 1994).

International Preliminary Report on Patentability and Written Opinion mailed Nov. 9, 2023, for PCT Application No. PCT/US2022/071986, ten pages.

* cited by examiner

IMPRINT LITHOGRAPHY PROCESS AND METHODS ON CURVED SURFACES

CROSS-REFERENCE TO RELATED APPLICATIONS

This application is a national stage application under 35 U.S.C. § 371 of International Application No. PCT/US2022/071986, filed internationally on Apr. 28, 2022, which claims priority to U.S. Provisional Application No. 63/182,522, filed on Apr. 30, 2021, the contents of which are both incorporated by reference herein in their entirety.

FIELD

This disclosure relates in general to imprint lithography on curved surfaces, for example, surfaces of curved waveguides.

BACKGROUND

It may be desirable to pattern micro-patterns or nano-patterns on curved surfaces. For example, fabricating a curved waveguide for a mixed reality (MR) device may include patterning micro-patterns or nano-patterns on a curved surface (e.g., a curved waveguide substrate), and the patterns may improve presentation of MR content on the device. The process of patterning micro-patterns or nano-patterns on curved surfaces may not be straightforward because conventional patterning processes (e.g., substrate thickness control (e.g., photo-lithography), total thickness variation (TTV), using a rigid super substrate (e.g., a template) may not reliably fabricate these patterns on a curved surface. For example, the conventional processes may lack an ability to control volume of curable material dispensed over such surfaces (e.g., on a substrate, under the superstrate).

To reliably and efficiently fabricate these patterns on a curved surface, an understanding of patterning mechanisms may be required. For example, some process parameters may not be flexible, while some other process parameters may be flexible. Identification of tunable parameters that may be optimized and allowing the parameters to be tuned may permit these patterns to be effectively fabricated on curved surfaces.

BRIEF SUMMARY

Methods for creating a pattern on a curved surface and an optical structure (e.g., curved waveguide, a lens having an antireflective feature, an optical structure of a wearable head device) are disclosed. In some embodiments, a method comprises: depositing a patterning material on a curved surface; positioning a superstrate over the patterning material, the superstrate comprising a template for creating a pattern; applying, using the patterning material, a force between the curved surface and the superstrate; curing the patterning material, wherein the cured patterning material comprises the pattern; and removing the superstrate.

In some embodiments, the method further comprises forming an optical structure using the pattern.

In some embodiments, the optical structure is formed by using the pattern to mold a curable resin.

In some embodiments, the optical structure comprises a curved waveguide.

In some embodiments, the pattern corresponds to a focal point of the curved waveguide.

In some embodiments, the optical structure comprises a lens having an antireflective feature corresponding to the pattern.

In some embodiments, the curved surface comprises one or more nano-channel arrangements.

In some embodiments, each of the one or more nano-channel arrangements is arranged at an angle of zero degree, twelve degrees, or twenty-two degrees relative to an edge of the curved surface.

In some embodiments, the method further comprises spreading the patterning material over the nano-channel arrangements.

In some embodiments, the force comprises a capillary force.

In some embodiments, the force is based on a thickness of the patterning material, a contact angle of patterning material, or both.

In some embodiments, the force maintains a position of the applied superstrate relative to the curved surface.

In some embodiments, depositing the patterning material on the curved surface comprises inkjetting the patterning material.

In some embodiments, positioning the superstrate over the patterning material comprises applying a force on the superstrate to bend the superstrate toward the curved surface.

In some embodiments, the force on the superstrate is applied using a roller or a mechanism.

In some embodiments, the force on the superstrate maintains a distance between the superstrate and the curved surface, and the distance corresponds to the applied force.

In some embodiments, the method further comprises ceasing applying the force on the superstrate after the force between the curved surface and the superstrate is applied using the patterning material.

In some embodiments, the superstrate comprises a flexible coated resist template.

In some embodiments, the superstrate comprises PC, polyethylene terephthalate, or both.

In some embodiments, the superstrate has a thickness of 50-550 μm.

In some embodiments, the superstrate has an elastic modulus less than 10 GPa.

In some embodiments, the method further comprises coating the pattern with a release layer.

In some embodiments, the method further comprises bonding the patterning material with the curved surface via a covalent bond.

In some embodiments, the first patterning material has a first volume, and the first patterning material is deposited at a first location with respect to the curved surface. The method further comprises depositing a second patterning material having a second volume at a second location with respect to the curved surface. A first thickness of the first patterning material at the first location corresponds to a thickness of the first volume, and a second thickness of the second patterning material at the second location corresponds to a thickness of the second volume.

In some embodiments, the first patterning material comprises a first material, and the first patterning material is deposited at a first location with respect to the curved surface. The method further comprises depositing a second patterning material comprising a second material at a second location with respect to the curved surface. A first thickness of the first patterning material at the first location corresponds to a property of the first material, and a second thickness of the second patterning material at the second location corresponds to a property of the second material.

In some embodiments, the first patterning material is deposited at a plurality of first locations of the curved surface, the first locations separated by first intervals, and the cured patterning material further comprises a second pattern. The method further comprises depositing a second patterning material at a plurality of second locations of the curved surface, the second locations separated by second intervals. The first intervals correspond to a first thickness for applying the first force for creating the first pattern, and the second intervals correspond to a second thickness for applying a second force for creating the second pattern.

In some embodiments, the method further comprises transferring, via etching, the pattern onto the curved surface.

In some embodiments, an optical stack comprises an optical feature. The optical feature is formed using any of the above methods.

In some embodiments, a system comprises: a wearable head device comprising a display. The display comprises an optical stack comprising an optical feature, and the optical feature is formed using any of the above methods; and one or more processors configured to execute a method comprising: presenting, on the display, content associated with a mixed reality environment, wherein the content is presented based on the optical feature.

DETAILED DESCRIPTION

Figure 1A:
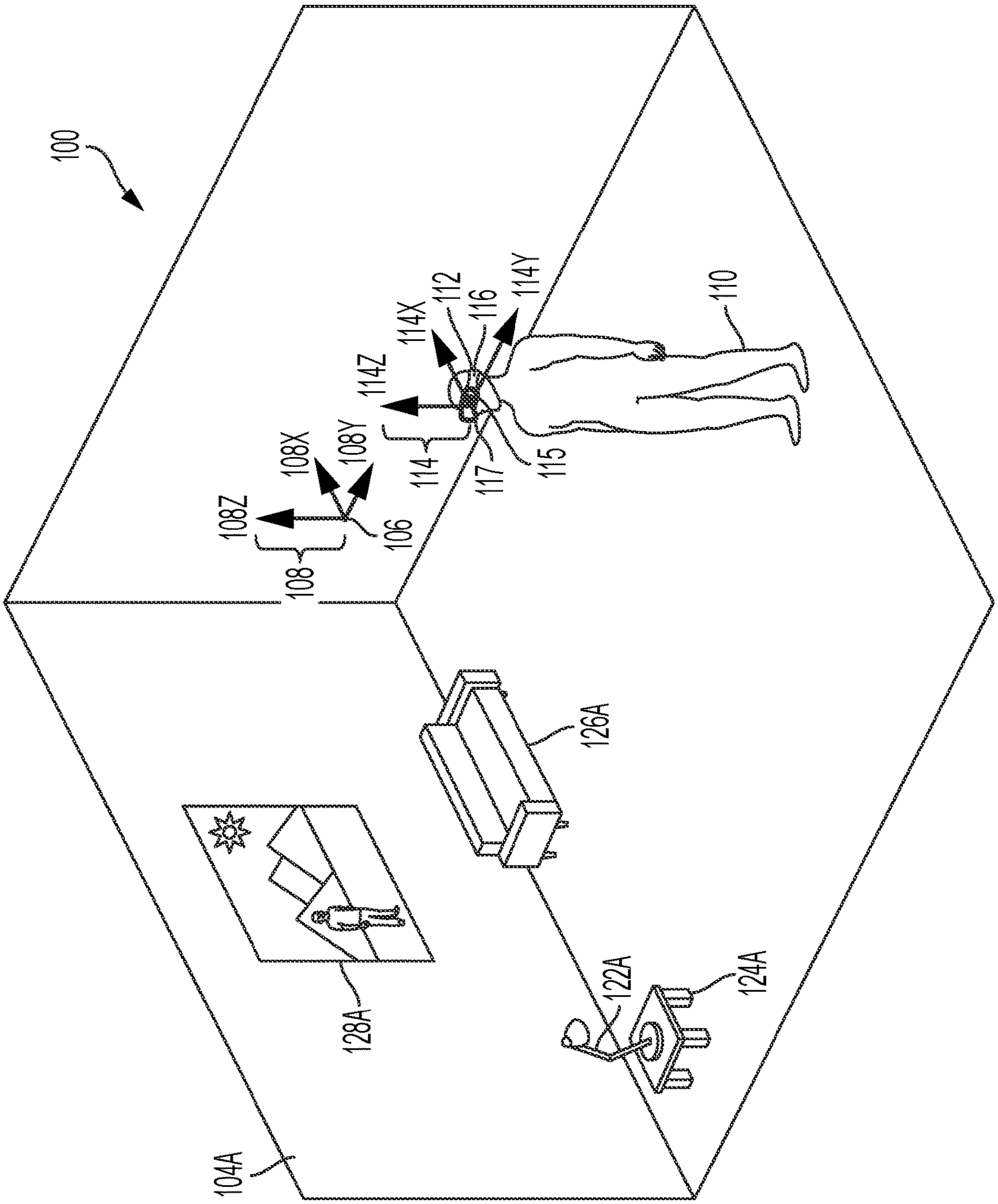
FIGS. 1A-1C illustrate exemplary environments, according to one or more embodiments of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Like all people, a user of a mixed reality system exists in a real environment—that is, a three-dimensional portion of the "real world," and all of its contents, that are perceptible by the user. For example, a user perceives a real environment using one's ordinary human senses—sight, sound, touch, taste, smell—and interacts with the real environment by moving one's own body in the real environment. Locations in a real environment can be described as coordinates in a coordinate space; for example, a coordinate can comprise latitude, longitude, and elevation with respect to sea level; distances in three orthogonal dimensions from a reference point; or other suitable values. Likewise, a vector can describe a quantity having a direction and a magnitude in the coordinate space.

A computing device can maintain, for example in a memory associated with the device, a representation of a virtual environment. As used herein, a virtual environment is a computational representation of a three-dimensional space. A virtual environment can include representations of any object, action, signal, parameter, coordinate, vector, or other characteristic associated with that space. In some examples, circuitry (e.g., a processor) of a computing device can maintain and update a state of a virtual environment; that is, a processor can determine at a first time t0, based on data associated with the virtual environment and/or input provided by a user, a state of the virtual environment at a second time t1. For instance, if an object in the virtual environment is located at a first coordinate at time t0, and has certain programmed physical parameters (e.g., mass, coefficient of friction); and an input received from user indicates that a force should be applied to the object in a direction vector; the processor can apply laws of kinematics to determine a location of the object at time t1 using basic mechanics. The processor can use any suitable information known about the virtual environment, and/or any suitable input, to determine a state of the virtual environment at a time t1. In maintaining and updating a state of a virtual environment, the processor can execute any suitable software, including software relating to the creation and deletion of virtual objects in the virtual environment; software (e.g., scripts) for defining behavior of virtual objects or characters in the virtual environment; software for defining the behavior of signals (e.g., audio signals) in the virtual environment; software for creating and updating parameters associated with the virtual environment; software for generating audio signals in the virtual environment; software for handling input and output; software for implementing network operations; software for applying asset data (e.g., animation data to move a virtual object over time); or many other possibilities.

Output devices, such as a display or a speaker, can present any or all aspects of a virtual environment to a user. For example, a virtual environment may include virtual objects (which may include representations of inanimate objects; people; animals; lights; etc.) that may be presented to a user. A processor can determine a view of the virtual environment (for example, corresponding to a "camera" with an origin coordinate, a view axis, and a frustum); and render, to a display, a viewable scene of the virtual environment corresponding to that view. Any suitable rendering technology may be used for this purpose. In some examples, the viewable scene may include some virtual objects in the virtual environment, and exclude certain other virtual objects. Similarly, a virtual environment may include audio aspects that may be presented to a user as one or more audio signals. For instance, a virtual object in the virtual environment may generate a sound originating from a location coordinate of the object (e.g., a virtual character may speak or cause a sound effect); or the virtual environment may be associated with musical cues or ambient sounds that may or may not be associated with a particular location. A processor can determine an audio signal corresponding to a "listener" coordinate—for instance, an audio signal corresponding to a composite of sounds in the virtual environment, and mixed and processed to simulate an audio signal that would be heard by a listener at the listener coordinate—and present the audio signal to a user via one or more speakers.

Because a virtual environment exists as a computational structure, a user may not directly perceive a virtual environment using one's ordinary senses. Instead, a user can perceive a virtual environment indirectly, as presented to the user, for example by a display, speakers, haptic output devices, etc. Similarly, a user may not directly touch, manipulate, or otherwise interact with a virtual environment; but can provide input data, via input devices or sensors, to a processor that can use the device or sensor data to update the virtual environment. For example, a camera sensor can provide optical data indicating that a user is trying to move an object in a virtual environment, and a processor can use that data to cause the object to respond accordingly in the virtual environment.

A mixed reality system can present to the user, for example using a transmissive display and/or one or more speakers (which may, for example, be incorporated into a wearable head device), a mixed reality environment (MRE) that combines aspects of a real environment and a virtual environment. In some embodiments, the one or more speakers may be external to the wearable head device. As used herein, a MRE is a simultaneous representation of a real environment and a corresponding virtual environment. In some examples, the corresponding real and virtual environments share a single coordinate space; in some examples, a real coordinate space and a corresponding virtual coordinate space are related to each other by a transformation matrix (or other suitable representation). Accordingly, a single coordinate (along with, in some examples, a transformation matrix) can define a first location in the real environment, and also a second, corresponding, location in the virtual environment; and vice versa.

In a MRE, a virtual object (e.g., in a virtual environment associated with the MRE) can correspond to a real object (e.g., in a real environment associated with the MRE). For instance, if the real environment of a MRE comprises a real lamp post (a real object) at a location coordinate, the virtual environment of the MRE may comprise a virtual lamp post (a virtual object) at a corresponding location coordinate. As used herein, the real object in combination with its corresponding virtual object together constitute a "mixed reality object." It is not necessary for a virtual object to perfectly match or align with a corresponding real object. In some examples, a virtual object can be a simplified version of a corresponding real object. For instance, if a real environment includes a real lamp post, a corresponding virtual object may comprise a cylinder of roughly the same height and radius as the real lamp post (reflecting that lamp posts may be roughly cylindrical in shape). Simplifying virtual objects in this manner can allow computational efficiencies, and can simplify calculations to be performed on such virtual objects. Further, in some examples of a MRE, not all real objects in a real environment may be associated with a corresponding virtual object. Likewise, in some examples of a MRE, not all virtual objects in a virtual environment may be associated with a corresponding real object. That is, some virtual objects may solely in a virtual environment of a MRE, without any real-world counterpart.

In some examples, virtual objects may have characteristics that differ, sometimes drastically, from those of corresponding real objects. For instance, while a real environment in a MRE may comprise a green, two-armed cactus—a prickly inanimate object—a corresponding virtual object in the MRE may have the characteristics of a green, two-armed virtual character with human facial features and a surly demeanor. In this example, the virtual object resembles its corresponding real object in certain characteristics (color, number of arms); but differs from the real object in other characteristics (facial features, personality). In this way, virtual objects have the potential to represent real objects in a creative, abstract, exaggerated, or fanciful manner; or to impart behaviors (e.g., human personalities) to otherwise inanimate real objects. In some examples, virtual objects may be purely fanciful creations with no real-world counterpart (e.g., a virtual monster in a virtual environment, perhaps at a location corresponding to an empty space in a real environment).

In some examples, virtual objects hay have characteristics that resemble corresponding real objects. For instance, a virtual character may be presented in a virtual or mixed reality environment as a life-like figure to provide a user an immersive mixed reality experience. With virtual characters having life-like characteristics, the user may feel like he or she is interacting with a real person. In such instances, it is desirable for actions such as muscle movements and gaze of the virtual character to appear natural. For example, movements of the virtual character should be similar to its corresponding real object (e.g., a virtual human should walk or move its arm like a real human). As another example, the gestures and positioning of the virtual human should appear natural, and the virtual human can initial interactions with the user (e.g., the virtual human can lead a collaborative experience with the user). Presentation of virtual characters having life-like characteristics is described in more detail herein.

Compared to virtual reality (VR) systems, which present the user with a virtual environment while obscuring the real environment, a mixed reality system presenting a MRE affords the advantage that the real environment remains perceptible while the virtual environment is presented. Accordingly, the user of the mixed reality system is able to use visual and audio cues associated with the real environment to experience and interact with the corresponding virtual environment. As an example, while a user of VR systems may struggle to perceive or interact with a virtual object displayed in a virtual environment—because, as noted herein, a user may not directly perceive or interact with a virtual environment—a user of an mixed reality (MR) system may find it more intuitive and natural to interact with a virtual object by seeing, hearing, and touching a corresponding real object in his or her own real environment. This level of interactivity may heighten a user's feelings of immersion, connection, and engagement with a virtual environment. Similarly, by simultaneously presenting a real environment and a virtual environment, mixed reality systems may reduce negative psychological feelings (e.g., cognitive dissonance) and negative physical feelings (e.g., motion sickness) associated with VR systems. Mixed reality systems further offer many possibilities for applications that may augment or alter our experiences of the real world.

FIG. 1A illustrates an exemplary real environment 100 in which a user 110 uses a mixed reality system 112. Mixed reality system 112 may comprise a display (e.g., a transmissive display), one or more speakers, and one or more sensors (e.g., a camera), for example as described herein. The real environment 100 shown comprises a rectangular room 104A, in which user 110 is standing; and real objects 122A (a lamp), 124A (a table), 126A (a sofa), and 128A (a painting). Room 104A may be spatially described with a location coordinate (e.g., coordinate system 108); locations of the real environment 100 may be described with respect to an origin of the location coordinate (e.g., point 106). As shown in FIG. 1A, an environment/world coordinate system 108 (comprising an x-axis 108X, a y-axis 108Y, and a z-axis 108Z) with its origin at point 106 (a world coordinate), can define a coordinate space for real environment 100. In some embodiments, the origin point 106 of the environment/world coordinate system 108 may correspond to where the mixed reality system 112 was powered on. In some embodiments, the origin point 106 of the environment/world coordinate system 108 may be reset during operation. In some examples, user 110 may be considered a real object in real environment 100; similarly, user 110's body parts (e.g., hands, feet) may be considered real objects in real environment 100. In some examples, a user/listener/head coordinate system 114 (comprising an x-axis 114X, a y-axis 114Y, and a z-axis 114Z) with its origin at point 115 (e.g., user/listener/head coordinate) can define a coordinate space for the user/listener/head on which the mixed reality system 112 is located. The origin point 115 of the user/listener/head coordinate system 114 may be defined relative to one or more components of the mixed reality system 112. For example, the origin point 115 of the user/listener/head coordinate system 114 may be defined relative to the display of the mixed reality system 112 such as during initial calibration of the mixed reality system 112. A matrix (which may include a translation matrix and a quaternion matrix, or other rotation matrix), or other suitable representation can characterize a transformation between the user/listener/head coordinate system 114 space and the environment/world coordinate system 108 space. In some embodiments, a left ear coordinate 116 and a right ear coordinate 117 may be defined relative to the origin point 115 of the user/listener/head coordinate system 114. A matrix (which may include a translation matrix and a quaternion matrix, or other rotation matrix), or other suitable representation can characterize a transformation between the left ear coordinate 116 and the right ear coordinate 117, and user/listener/head coordinate system 114 space. The user/listener/head coordinate system 114 can simplify the representation of locations relative to the user's head, or to a head-mounted device, for example, relative to the environment/world coordinate system 108. Using Simultaneous Localization and Mapping (SLAM), visual odometry, or other techniques, a transformation between user coordinate system 114 and environment coordinate system 108 can be determined and updated in real-time.

Figure 1B:
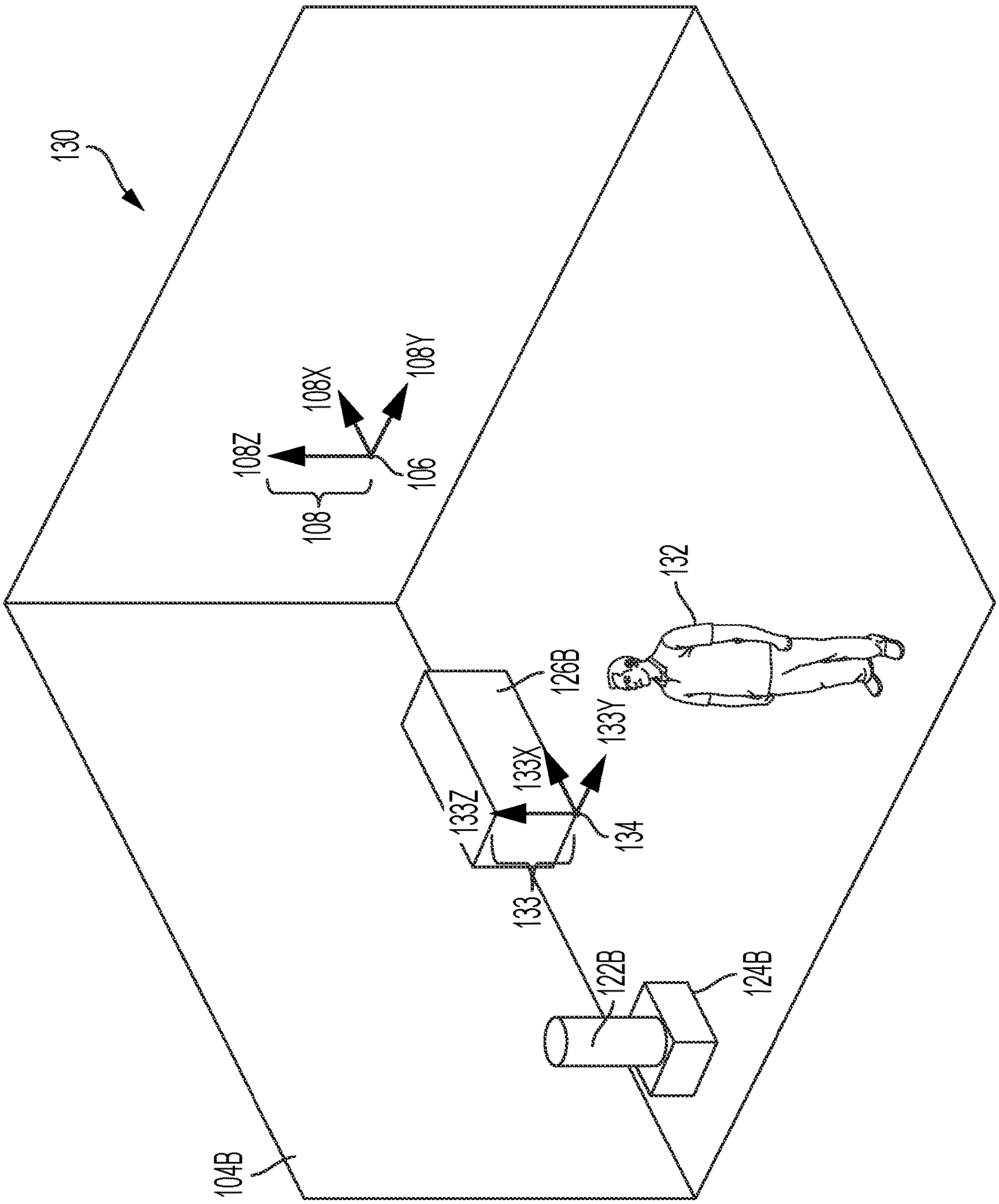

FIG. 1B illustrates an exemplary virtual environment 130 that corresponds to real environment 100. The virtual environment 130 shown comprises a virtual rectangular room 104B corresponding to real rectangular room 104A; a virtual object 122B corresponding to real object 122A; a virtual object 124B corresponding to real object 124A; and a virtual object 126B corresponding to real object 126A. Metadata associated with the virtual objects 122B, 124B, 126B can include information derived from the corresponding real objects 122A, 124A, 126A. Virtual environment 130 additionally comprises a virtual character 132, which may not correspond to any real object in real environment 100. Real object 128A in real environment 100 may not correspond to any virtual object in virtual environment 130. A persistent coordinate system 133 (comprising an x-axis 133X, a y-axis 133Y, and a z-axis 133Z) with its origin at point 134 (persistent coordinate), can define a coordinate space for virtual content. The origin point 134 of the persistent coordinate system 133 may be defined relative/with respect to one or more real objects, such as the real object 126A. A matrix (which may include a translation matrix and a quaternion matrix, or other rotation matrix), or other suitable representation can characterize a transformation between the persistent coordinate system 133 space and the environment/world coordinate system 108 space. In some embodiments, each of the virtual objects 122B, 124B, 126B, and 132 may have its own persistent coordinate point relative to the origin point 134 of the persistent coordinate system 133. In some embodiments, there may be multiple persistent coordinate systems and each of the virtual objects 122B, 124B, 126B, and 132 may have its own persistent coordinate points relative to one or more persistent coordinate systems.

Persistent coordinate data may be coordinate data that persists relative to a physical environment. Persistent coordinate data may be used by MR systems (e.g., MR system 112, 200) to place persistent virtual content, which may not be tied to movement of a display on which the virtual object is being displayed. For example, a two-dimensional screen may display virtual objects relative to a position on the screen. As the two-dimensional screen moves, the virtual content may move with the screen. In some embodiments, persistent virtual content may be displayed in a corner of a room. A MR user may look at the corner, see the virtual content, look away from the corner (where the virtual content may no longer be visible because the virtual content may have moved from within the user's field of view to a location outside the user's field of view due to motion of the user's head), and look back to see the virtual content in the corner (similar to how a real object may behave).

In some embodiments, persistent coordinate data (e.g., a persistent coordinate system and/or a persistent coordinate frame) can include an origin point and three axes. For example, a persistent coordinate system may be assigned to a center of a room by a MR system. In some embodiments, a user may move around the room, out of the room, re-enter the room, etc., and the persistent coordinate system may remain at the center of the room (e.g., because it persists relative to the physical environment). In some embodiments, a virtual object may be displayed using a transform to persistent coordinate data, which may enable displaying persistent virtual content. In some embodiments, a MR system may use simultaneous localization and mapping to generate persistent coordinate data (e.g., the MR system may assign a persistent coordinate system to a point in space). In some embodiments, a MR system may map an environment by generating persistent coordinate data at regular intervals (e.g., a MR system may assign persistent coordinate systems in a grid where persistent coordinate systems may be at least within five feet of another persistent coordinate system).

In some embodiments, persistent coordinate data may be generated by a MR system and transmitted to a remote server. In some embodiments, a remote server may be configured to receive persistent coordinate data. In some embodiments, a remote server may be configured to synchronize persistent coordinate data from multiple observation instances. For example, multiple MR systems may map the same room with persistent coordinate data and transmit that data to a remote server. In some embodiments, the remote server may use this observation data to generate canonical persistent coordinate data, which may be based on the one or more observations. In some embodiments, canonical persistent coordinate data may be more accurate and/or reliable than a single observation of persistent coordinate data. In some embodiments, canonical persistent coordinate data may be transmitted to one or more MR systems. For example, a MR system may use image recognition and/or location data to recognize that it is located in a room that has corresponding canonical persistent coordinate data (e.g., because other MR systems have previously mapped the room). In some embodiments, the MR system may receive canonical persistent coordinate data corresponding to its location from a remote server.

With respect to FIGS. 1A and 1B, environment/world coordinate system 108 defines a shared coordinate space for both real environment 100 and virtual environment 130. In the example shown, the coordinate space has its origin at point 106. Further, the coordinate space is defined by the same three orthogonal axes (108X, 108Y, 108Z). Accordingly, a first location in real environment 100, and a second, corresponding location in virtual environment 130, can be described with respect to the same coordinate space. This simplifies identifying and displaying corresponding locations in real and virtual environments, because the same coordinates can be used to identify both locations. However, in some examples, corresponding real and virtual environments need not use a shared coordinate space. For instance, in some examples (not shown), a matrix (which may include a translation matrix and a quaternion matrix, or other rotation matrix), or other suitable representation can characterize a transformation between a real environment coordinate space and a virtual environment coordinate space.

Figure 1C:
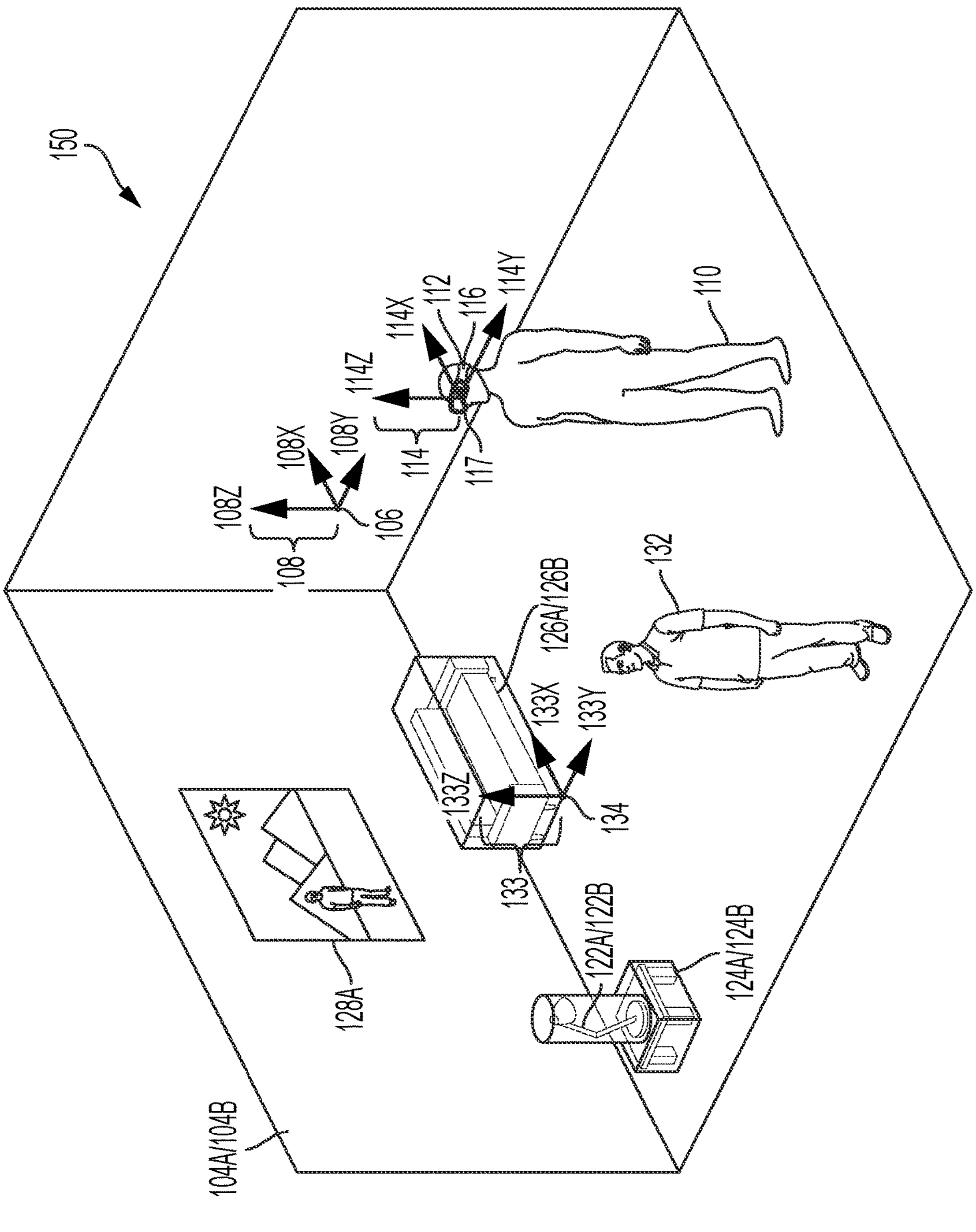

FIG. 1C illustrates an exemplary MRE 150 that simultaneously presents aspects of real environment 100 and virtual environment 130 to user 110 via mixed reality system 112. In the example shown, MRE 150 simultaneously presents user 110 with real objects 122A, 124A, 126A, and 128A from real environment 100 (e.g., via a transmissive portion of a display of mixed reality system 112); and virtual objects 122B, 124B, 126B, and 132 from virtual environment 130 (e.g., via an active display portion of the display of mixed reality system 112). As described herein, origin point 106 acts as an origin for a coordinate space corresponding to MRE 150, and coordinate system 108 defines an x-axis, y-axis, and z-axis for the coordinate space.

In the example shown, mixed reality objects comprise corresponding pairs of real objects and virtual objects (e.g., 122A/122B, 124A/124B, 126A/126B) that occupy corresponding locations in coordinate space 108. In some examples, both the real objects and the virtual objects may be simultaneously visible to user 110. This may be desirable in, for example, instances where the virtual object presents information designed to augment a view of the corresponding real object (such as in a museum application where a virtual object presents the missing pieces of an ancient damaged sculpture). In some examples, the virtual objects (122B, 124B, and/or 126B) may be displayed (e.g., via active pixelated occlusion using a pixelated occlusion shutter) so as to occlude the corresponding real objects (122A, 124A, and/or 126A). This may be desirable in, for example, instances where the virtual object acts as a visual replacement for the corresponding real object (such as in an interactive storytelling application where an inanimate real object becomes a "living" character).

In some examples, real objects (e.g., 122A, 124A, 126A) may be associated with virtual content or helper data that may not necessarily constitute virtual objects. Virtual content or helper data can facilitate processing or handling of virtual objects in the mixed reality environment. For example, such virtual content could include two-dimensional representations of corresponding real objects; custom asset types associated with corresponding real objects; or statistical data associated with corresponding real objects. This information can enable or facilitate calculations involving a real object without incurring unnecessary computational overhead.

In some examples, the presentation described herein may also incorporate audio aspects. For instance, in MRE 150, virtual character 132 could be associated with one or more audio signals, such as a footstep sound effect that is generated as the character walks around MRE 150. As described herein, a processor of mixed reality system 112 can compute an audio signal corresponding to a mixed and processed composite of all such sounds in MRE 150, and present the audio signal to user 110 via one or more speakers included in mixed reality system 112 and/or one or more external speakers.

Example mixed reality system 112 can include a wearable head device (e.g., a wearable augmented reality or mixed reality head device) comprising a display (which may comprise left and right transmissive displays, which may be near-eye displays, and associated components for coupling light from the displays to the user's eyes); left and right speakers (e.g., positioned adjacent to the user's left and right ears, respectively); an inertial measurement unit (IMU) (e.g., mounted to a temple arm of the head device); an orthogonal coil electromagnetic receiver (e.g., mounted to the left temple piece); left and right cameras (e.g., depth (time-of-flight) cameras) oriented away from the user; and left and right eye cameras oriented toward the user (e.g., for detecting the user's eye movements). However, a mixed reality system 112 can incorporate any suitable display technology, and any suitable sensors (e.g., optical, infrared, acoustic, LIDAR, EOG, GPS, magnetic). In addition, mixed reality system 112 may incorporate networking features (e.g., Wi-Fi capability, mobile network (e.g., 4G, 5G) capability) to communicate with other devices and systems, including neural networks (e.g., in the cloud) for data processing and training data associated with presentation of elements (e.g., virtual character 132) in the MRE 150 and other mixed reality systems. Mixed reality system 112 may further include a battery (which may be mounted in an auxiliary unit, such as a belt pack designed to be worn around a user's waist), a processor, and a memory. The wearable head device of mixed reality system 112 may include tracking components, such as an IMU or other suitable sensors, configured to output a set of coordinates of the wearable head device relative to the user's environment. In some examples, tracking components may provide input to a processor performing a Simultaneous Localization and Mapping (SLAM) and/or visual odometry algorithm. In some examples, mixed reality system 112 may also include a handheld controller 300, and/or an auxiliary unit 320, which may be a wearable beltpack, as described herein.

In some embodiments, an animation rig is used to present the virtual character 132 in the MRE 150. Although the animation rig is described with respect to virtual character 132, it is understood that the animation rig may be associated with other characters (e.g., a human character, an animal character, an abstract character) in the MRE 150. Movement of the animation rig is described in more detail herein.

Figure 2A:
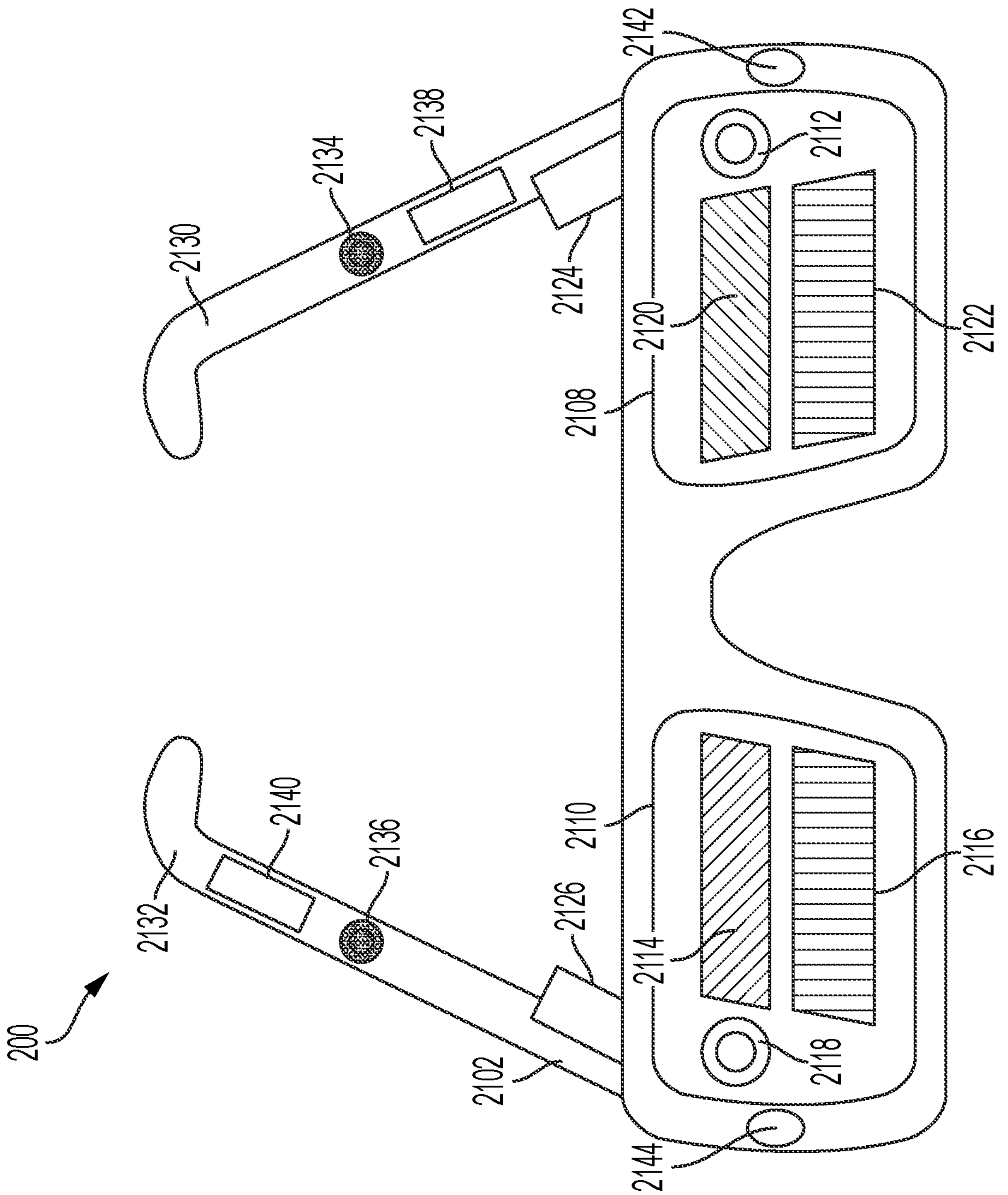
FIGS. 2A-2D illustrate components of exemplary mixed reality systems, according to embodiments of the disclosure.
Figure 2B:
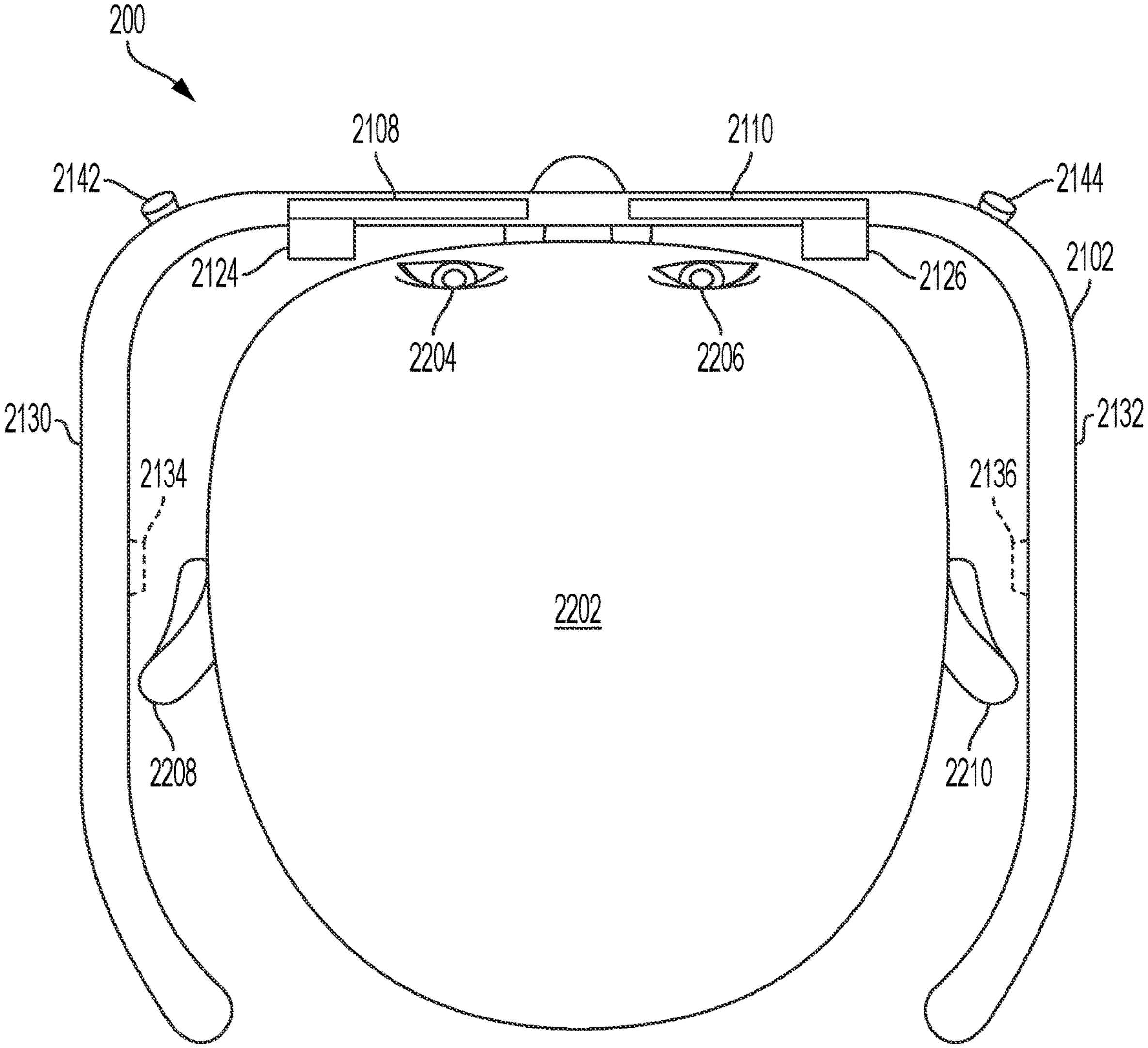
Figure 2C:
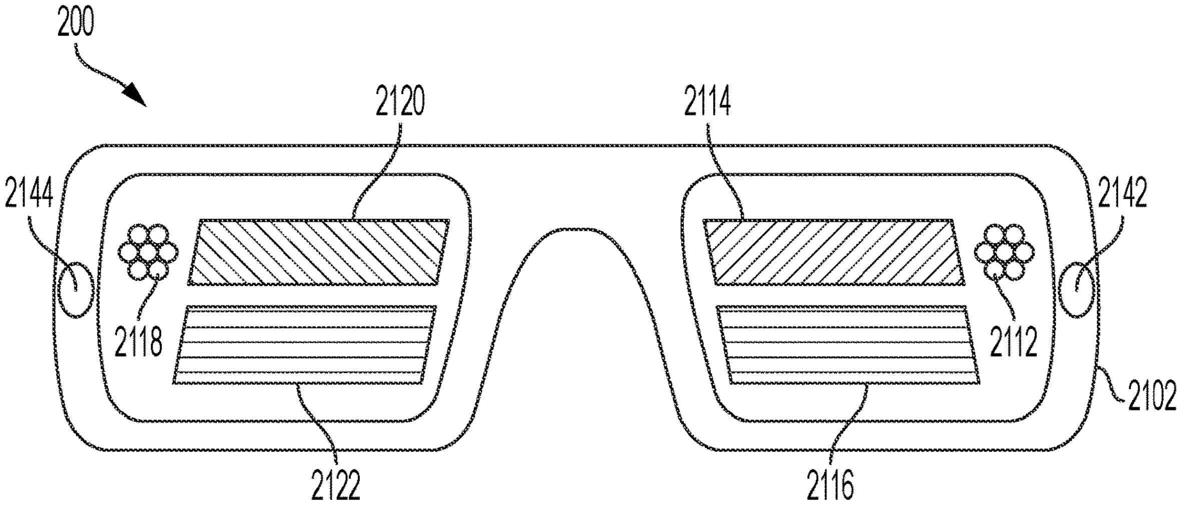
Figure 2D:
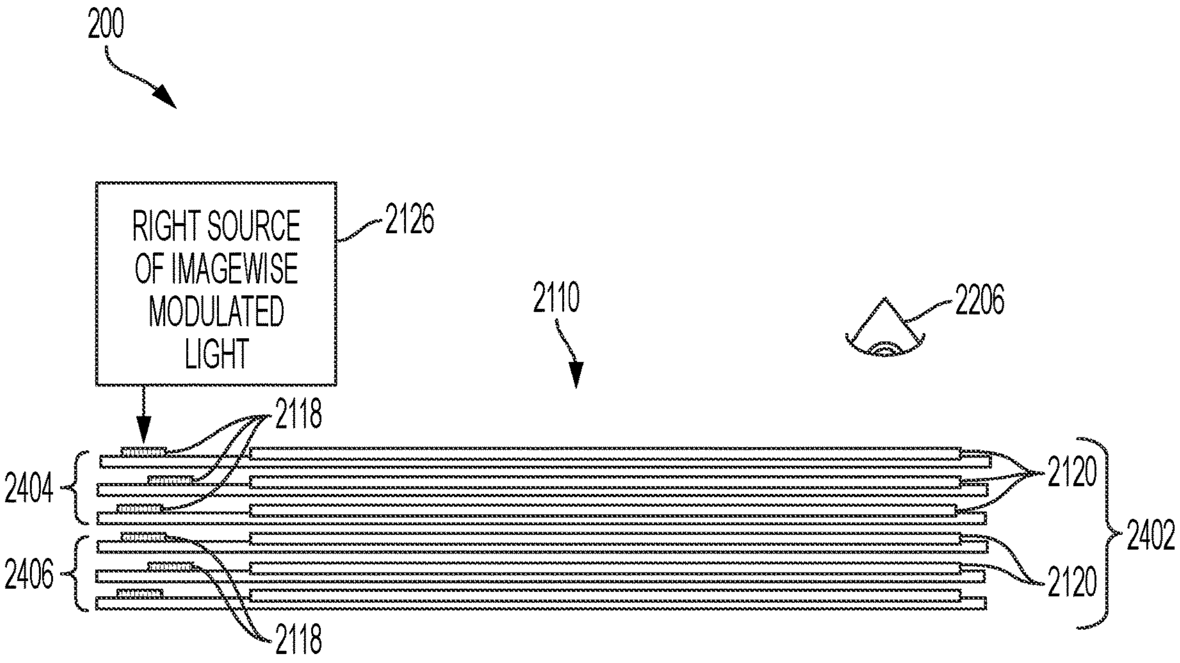

FIGS. 2A-2D illustrate components of an exemplary mixed reality system 200 (which may correspond to mixed reality system 112) that may be used to present a MRE (which may correspond to MRE 150), or other virtual environment, to a user. FIG. 2A illustrates a perspective view of a wearable head device 2102 included in example mixed reality system 200. FIG. 2B illustrates a top view of wearable head device 2102 worn on a user's head 2202. FIG. 2C illustrates a front view of wearable head device 2102. FIG. 2D illustrates an edge view of example eyepiece 2110 of wearable head device 2102. As shown in FIGS. 2A-2C, the example wearable head device 2102 includes an exemplary left eyepiece (e.g., a left transparent waveguide set eyepiece) 2108 and an exemplary right eyepiece (e.g., a right transparent waveguide set eyepiece) 2110. Each eyepiece 2108 and 2110 can include transmissive elements through which a real environment can be visible, as well as display elements for presenting a display (e.g., via imagewise modulated light) overlapping the real environment. In some examples, such display elements can include surface diffractive optical elements for controlling the flow of imagewise modulated light. For instance, the left eyepiece 2108 can include a left incoupling grating set 2112, a left orthogonal pupil expansion (OPE) grating set 2120, and a left exit (output) pupil expansion (EPE) grating set 2122. Similarly, the right eyepiece 2110 can include a right incoupling grating set 2118, a right OPE grating set 2114 and a right EPE grating set 2116. Imagewise modulated light can be transferred to a user's eye via the incoupling gratings 2112 and 2118, OPEs 2114 and 2120, and EPE 2116 and 2122. Each incoupling grating set 2112, 2118 can be configured to deflect light toward its corresponding OPE grating set 2120, 2114. Each OPE grating set 2120, 2114 can be designed to incrementally deflect light down toward its associated EPE 2122, 2116, thereby horizontally extending an exit pupil being formed. Each EPE 2122, 2116 can be configured to incrementally redirect at least a portion of light received from its corresponding OPE grating set 2120, 2114 outward to a user eyebox position (not shown) defined behind the eyepieces 2108, 2110, vertically extending the exit pupil that is formed at the eyebox. Alternatively, in lieu of the incoupling grating sets 2112 and 2118, OPE grating sets 2114 and 2120, and EPE grating sets 2116 and 2122, the eyepieces 2108 and 2110 can include other arrangements of gratings and/or refractive and reflective features for controlling the coupling of imagewise modulated light to the user's eyes.

In some examples, wearable head device 2102 can include a left temple arm 2130 and a right temple arm 2132, where the left temple arm 2130 includes a left speaker 2134 and the right temple arm 2132 includes a right speaker 2136. An orthogonal coil electromagnetic receiver 2138 can be located in the left temple piece, or in another suitable location in the wearable head unit 2102. An Inertial Measurement Unit (IMU) 2140 can be located in the right temple arm 2132, or in another suitable location in the wearable head device 2102. The wearable head device 2102 can also include a left depth (e.g., time-of-flight) camera 2142 and a right depth camera 2144. The depth cameras 2142, 2144 can be suitably oriented in different directions so as to together cover a wider field of view.

In the example shown in FIGS. 2A-2D, a left source of imagewise modulated light 2124 can be optically coupled into the left eyepiece 2108 through the left incoupling grating set 2112, and a right source of imagewise modulated light 2126 can be optically coupled into the right eyepiece 2110 through the right incoupling grating set 2118. Sources of imagewise modulated light 2124, 2126 can include, for example, optical fiber scanners; projectors including electronic light modulators such as Digital Light Processing (DLP) chips or Liquid Crystal on Silicon (LCoS) modulators; or emissive displays, such as micro Light Emitting Diode (LED) or micro Organic Light Emitting Diode (OLED) panels coupled into the incoupling grating sets 2112, 2118 using one or more lenses per side. The input coupling grating sets 2112, 2118 can deflect light from the sources of imagewise modulated light 2124, 2126 to angles above the critical angle for Total Internal Reflection (TIR) for the eyepieces 2108, 2110. The OPE grating sets 2114, 2120 incrementally deflect light propagating by TIR down toward the EPE grating sets 2116, 2122. The EPE grating sets 2116, 2122 incrementally couple light toward the user's face, including the pupils of the user's eyes.

In some examples, as shown in FIG. 2D, each of the left eyepiece 2108 and the right eyepiece 2110 includes a plurality of waveguides 2402. For example, each eyepiece 2108, 2110 can include multiple individual waveguides, each dedicated to a respective color channel (e.g., red, blue, and green). In some examples, each eyepiece 2108, 2110 can include multiple sets of such waveguides, with each set configured to impart different wavefront curvature to emitted light. The wavefront curvature may be convex with respect to the user's eyes, for example to present a virtual object positioned a distance in front of the user (e.g., by a distance corresponding to the reciprocal of wavefront curvature). In some examples, EPE grating sets 2116, 2122 can include curved grating grooves to effect convex wavefront curvature by altering the Poynting vector of exiting light across each EPE.

In some examples, to create a perception that displayed content is three-dimensional, stereoscopically-adjusted left and right eye imagery can be presented to the user through the imagewise light modulators 2124, 2126 and the eyepieces 2108, 2110. The perceived realism of a presentation of a three-dimensional virtual object can be enhanced by selecting waveguides (and thus corresponding the wavefront curvatures) such that the virtual object is displayed at a distance approximating a distance indicated by the stereoscopic left and right images. This technique may also reduce motion sickness experienced by some users, which may be caused by differences between the depth perception cues provided by stereoscopic left and right eye imagery, and the autonomic accommodation (e.g., object distance-dependent focus) of the human eye.

FIG. 2D illustrates an edge-facing view from the top of the right eyepiece 2110 of example wearable head device 2102. As shown in FIG. 2D, the plurality of waveguides 2402 can include a first subset of three waveguides 2404 and a second subset of three waveguides 2406. The two subsets of waveguides 2404, 2406 can be differentiated by different EPE gratings featuring different grating line curvatures to impart different wavefront curvatures to exiting light. Within each of the subsets of waveguides 2404, 2406 each waveguide can be used to couple a different spectral channel (e.g., one of red, green and blue spectral channels) to the user's right eye 2206. Although not shown in FIG. 2D, the structure of the left eyepiece 2108 may be mirrored relative to the structure of the right eyepiece 2110.

Figure 3A:
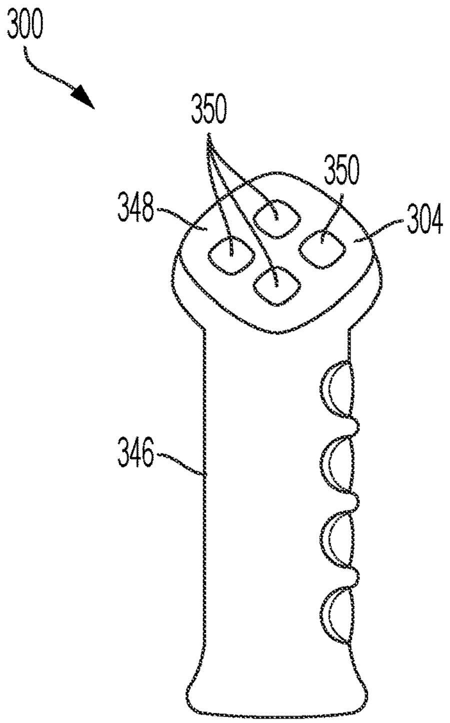
FIG. 3A illustrates an exemplary mixed reality handheld controller, according to embodiments of the disclosure.

FIG. 3A illustrates an exemplary handheld controller component 300 of a mixed reality system 200. In some examples, handheld controller 300 includes a grip portion 346 and one or more buttons 350 disposed along a top surface 348. In some examples, buttons 350 may be configured for use as an optical tracking target, e.g., for tracking six-degree-of-freedom (6DOF) motion of the handheld controller 300, in conjunction with a camera or other optical sensor (which may be mounted in a head unit (e.g., wearable head device 2102) of mixed reality system 200). In some examples, handheld controller 300 includes tracking components (e.g., an IMU or other suitable sensors) for detecting position or orientation, such as position or orientation relative to wearable head device 2102. In some examples, such tracking components may be positioned in a handle of handheld controller 300, and/or may be mechanically coupled to the handheld controller. Handheld controller 300 can be configured to provide one or more output signals corresponding to one or more of a pressed state of the buttons; or a position, orientation, and/or motion of the handheld controller 300 (e.g., via an IMU). Such output signals may be used as input to a processor of mixed reality system 200. Such input may correspond to a position, orientation, and/or movement of the handheld controller (and, by extension, to a position, orientation, and/or movement of a hand of a user holding the controller). Such input may also correspond to a user pressing buttons 350.

Figure 3B:
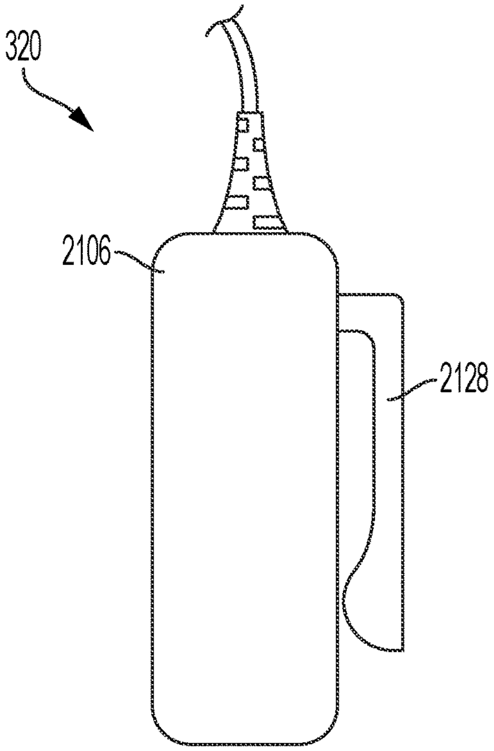
FIG. 3B illustrates an exemplary auxiliary unit, according to embodiments of the disclosure.

FIG. 3B illustrates an exemplary auxiliary unit 320 of a mixed reality system 200. The auxiliary unit 320 can include a battery to provide energy to operate the system 200, and can include a processor for executing programs to operate the system 200. As shown, the example auxiliary unit 320 includes a clip 2128, such as for attaching the auxiliary unit 320 to a user's belt. Other form factors are suitable for auxiliary unit 320 and will be apparent, including form factors that do not involve mounting the unit to a user's belt. In some examples, auxiliary unit 320 is coupled to the wearable head device 2102 through a multiconduit cable that can include, for example, electrical wires and fiber optics. Wireless connections between the auxiliary unit 320 and the wearable head device 2102 can also be used.

In some examples, mixed reality system 200 can include one or more microphones to detect sound and provide corresponding signals to the mixed reality system. In some examples, a microphone may be attached to, or integrated with, wearable head device 2102, and may be configured to detect a user's voice. In some examples, a microphone may be attached to, or integrated with, handheld controller 300 and/or auxiliary unit 320. Such a microphone may be configured to detect environmental sounds, ambient noise, voices of a user or a third party, or other sounds.

Figure 4:
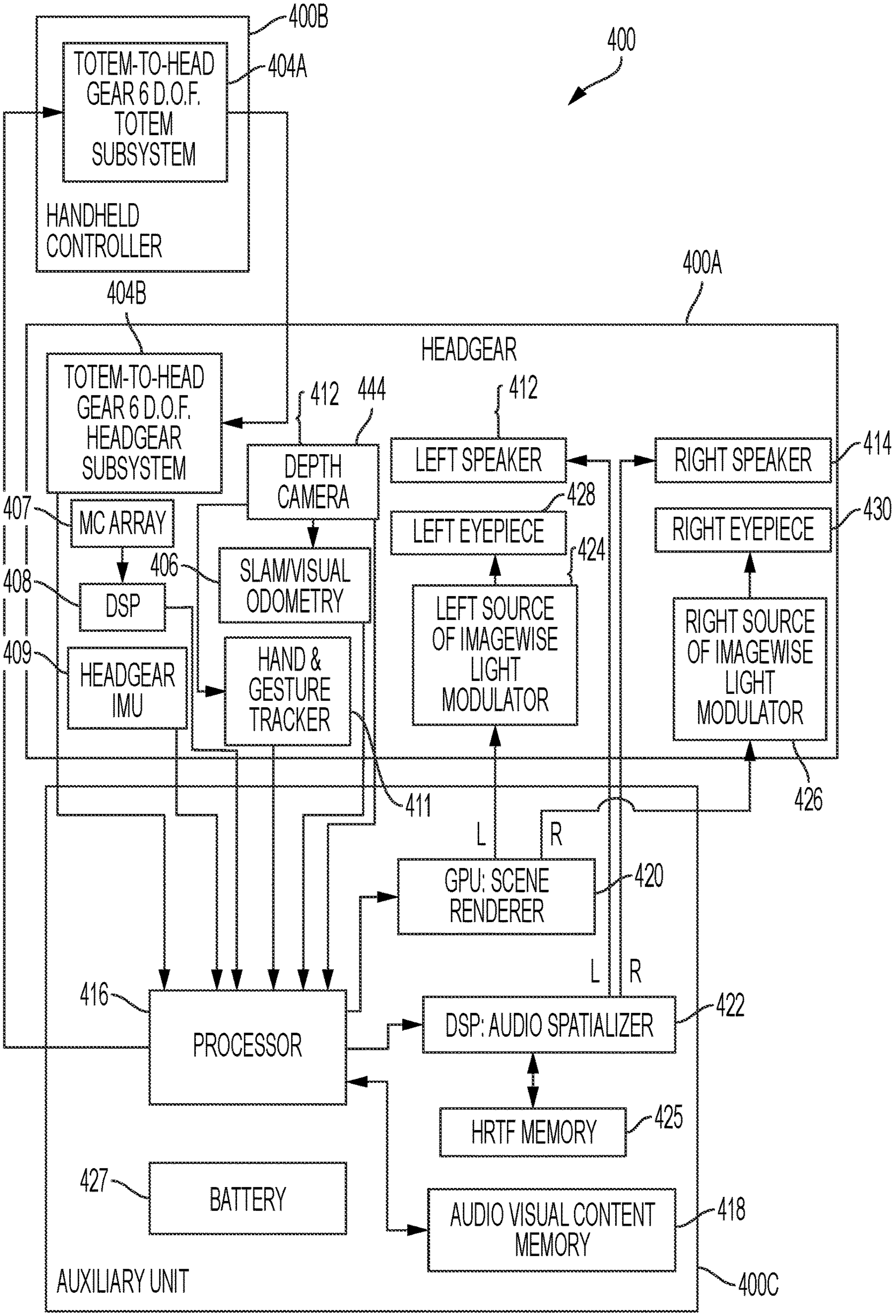
FIG. 4 illustrates an exemplary functional block diagram of an exemplary mixed reality system, according to embodiments of the disclosure.

FIG. 4 shows an exemplary functional block diagram that may correspond to an exemplary mixed reality system, such as mixed reality system 200 described herein (which may correspond to mixed reality system 112 with respect to FIG. 1). Elements of wearable system 400 may be used to implement the methods, operations, and features described in this disclosure. As shown in FIG. 4, example handheld controller 400B (which may correspond to handheld controller 300 (a "totem")) includes a totem-to-wearable head device six degree of freedom (6DOF) totem subsystem 404A and example wearable head device 400A (which may correspond to wearable head device 2102) includes a totem-to-wearable head device 6DOF subsystem 404B. In the example, the 6DOF totem subsystem 404A and the 6DOF subsystem 404B cooperate to determine six coordinates (e.g., offsets in three translation directions and rotation along three axes) of the handheld controller 400B relative to the wearable head device 400A. The six degrees of freedom may be expressed relative to a coordinate system of the wearable head device 400A. The three translation offsets may be expressed as X, Y, and Z offsets in such a coordinate system, as a translation matrix, or as some other representation. The rotation degrees of freedom may be expressed as sequence of yaw, pitch, and roll rotations, as a rotation matrix, as a quaternion, or as some other representation. In some examples, the wearable head device 400A; one or more depth cameras 444 (and/or one or more non-depth cameras) included in the wearable head device 400A; and/or one or more optical targets (e.g., buttons 350 of handheld controller 400B as described herein, or dedicated optical targets included in the handheld controller 400B) can be used for 6DOF tracking. In some examples, the handheld controller 400B can include a camera, as described herein; and the wearable head device 400A can include an optical target for optical tracking in conjunction with the camera. In some examples, the wearable head device 400A and the handheld controller 400B each include a set of three orthogonally oriented solenoids which are used to wirelessly send and receive three distinguishable signals. By measuring the relative magnitude of the three distinguishable signals received in each of the coils used for receiving, the 6DOF of the wearable head device 400A relative to the handheld controller 400B may be determined. Additionally, 6DOF totem subsystem 404A can include an Inertial Measurement Unit (IMU) that is useful to provide improved accuracy and/or more timely information on rapid movements of the handheld controller 400B.

In some embodiments, wearable system 400 can include microphone array 407, which can include one or more microphones arranged on headgear device 400A. In some embodiments, microphone array 407 can include four microphones. Two microphones can be placed on a front face of headgear 400A, and two microphones can be placed at a rear of head headgear 400A (e.g., one at a back-left and one at a back-right). In some embodiments, signals received by microphone array 407 can be transmitted to DSP 408. DSP 408 can be configured to perform signal processing on the signals received from microphone array 407. For example, DSP 408 can be configured to perform noise reduction, acoustic echo cancellation, and/or beamforming on signals received from microphone array 407. DSP 408 can be configured to transmit signals to processor 416.

In some examples, it may become necessary to transform coordinates from a local coordinate space (e.g., a coordinate space fixed relative to the wearable head device 400A) to an inertial coordinate space (e.g., a coordinate space fixed relative to the real environment), for example in order to compensate for the movement of the wearable head device 400A (e.g., of MR system 112) relative to the coordinate system 108. For instance, such transformations may be necessary for a display of the wearable head device 400A to present a virtual object at an expected position and orientation relative to the real environment (e.g., a virtual person sitting in a real chair, facing forward, regardless of the wearable head device's position and orientation), rather than at a fixed position and orientation on the display (e.g., at the same position in the right lower corner of the display), to preserve the illusion that the virtual object exists in the real environment (and does not, for example, appear positioned unnaturally in the real environment as the wearable head device 400A shifts and rotates). In some examples, a compensatory transformation between coordinate spaces can be determined by processing imagery from the depth cameras 444 using a SLAM and/or visual odometry procedure in order to determine the transformation of the wearable head device 400A relative to the coordinate system 108. In the example shown in FIG. 4, the depth cameras 444 are coupled to a SLAM/visual odometry block 406 and can provide imagery to block 406. The SLAM/visual odometry block 406 implementation can include a processor configured to process this imagery and determine a position and orientation of the user's head, which can then be used to identify a transformation between a head coordinate space and another coordinate space (e.g., an inertial coordinate space). Similarly, in some examples, an additional source of information on the user's head pose and location is obtained from an IMU 409. Information from the IMU 409 can be integrated with information from the SLAM/visual odometry block 406 to provide improved accuracy and/or more timely information on rapid adjustments of the user's head pose and position.

In some examples, the depth cameras 444 can supply 3D imagery to a hand gesture tracker 411, which may be implemented in a processor of the wearable head device 400A. The hand gesture tracker 411 can identify a user's hand gestures, for example by matching 3D imagery received from the depth cameras 444 to stored patterns representing hand gestures. Other suitable techniques of identifying a user's hand gestures will be apparent.

In some examples, one or more processors 416 may be configured to receive data from the wearable head device's 6DOF headgear subsystem 404B, the IMU 409, the SLAM/visual odometry block 406, depth cameras 444, and/or the hand gesture tracker 411. The processor 416 can also send and receive control signals from the 6DOF totem system 404A. The processor 416 may be coupled to the 6DOF totem system 404A wirelessly, such as in examples where the handheld controller 400B is untethered. Processor 416 may further communicate with additional components, such as an audio-visual content memory 418, a Graphical Processing Unit (GPU) 420, and/or a Digital Signal Processor (DSP) audio spatializer 422. The DSP audio spatializer 422 may be coupled to a Head Related Transfer Function (HRTF) memory 425. The GPU 420 can include a left channel output coupled to the left source of imagewise modulated light 424 (e.g., for displaying content on left eyepiece 428) and a right channel output coupled to the right source of imagewise modulated light 426 (e.g., for displaying content on right eyepiece 430). GPU 420 can output stereoscopic image data to the sources of imagewise modulated light 424, 426, for example as described herein with respect to FIGS. 2A-2D. In some examples, the GPU 420 may be used to render virtual elements in the MRE presented on the display of the wearable system 400. The DSP audio spatializer 422 can output audio to a left speaker 412 and/or a right speaker 414. The DSP audio spatializer 422 can receive input from processor 419 indicating a direction vector from a user to a virtual sound source (which may be moved by the user, e.g., via the handheld controller 320). Based on the direction vector, the DSP audio spatializer 422 can determine a corresponding HRTF (e.g., by accessing a HRTF, or by interpolating multiple HRTFs). The DSP audio spatializer 422 can then apply the determined HRTF to an audio signal, such as an audio signal corresponding to a virtual sound generated by a virtual object. This can enhance the believability and realism of the virtual sound, by incorporating the relative position and orientation of the user relative to the virtual sound in the mixed reality environment—that is, by presenting a virtual sound that matches a user's expectations of what that virtual sound would sound like if it were a real sound in a real environment.

In some examples, such as shown in FIG. 4, one or more of processor 416, GPU 420, DSP audio spatializer 422, HRTF memory 425, and audio/visual content memory 418 may be included in an auxiliary unit 400C (which may correspond to auxiliary unit 320 described herein). The auxiliary unit 400C may include a battery 427 to power its components and/or to supply power to the wearable head device 400A or handheld controller 400B. Including such components in an auxiliary unit, which can be mounted to a user's waist, can limit the size and weight of the wearable head device 400A, which can in turn reduce fatigue of a user's head and neck.

While FIG. 4 presents elements corresponding to various components of an example wearable systems 400, various other suitable arrangements of these components will become apparent to those skilled in the art. For example, the headgear device 400A illustrated in may include a processor and/or a battery (not shown). The included processor and/or battery may operate together with or operate in place of the processor and/or battery of the auxiliary unit 400C. Generally, as another example, elements presented or functionalities described with respect to FIG. 4 as being associated with auxiliary unit 400C could instead be associated with headgear device 400A or handheld controller 400B. Furthermore, some wearable systems may forgo entirely a handheld controller 400B or auxiliary unit 400C. Such changes and modifications are to be understood as being included within the scope of the disclosed examples.

Figure 5A:
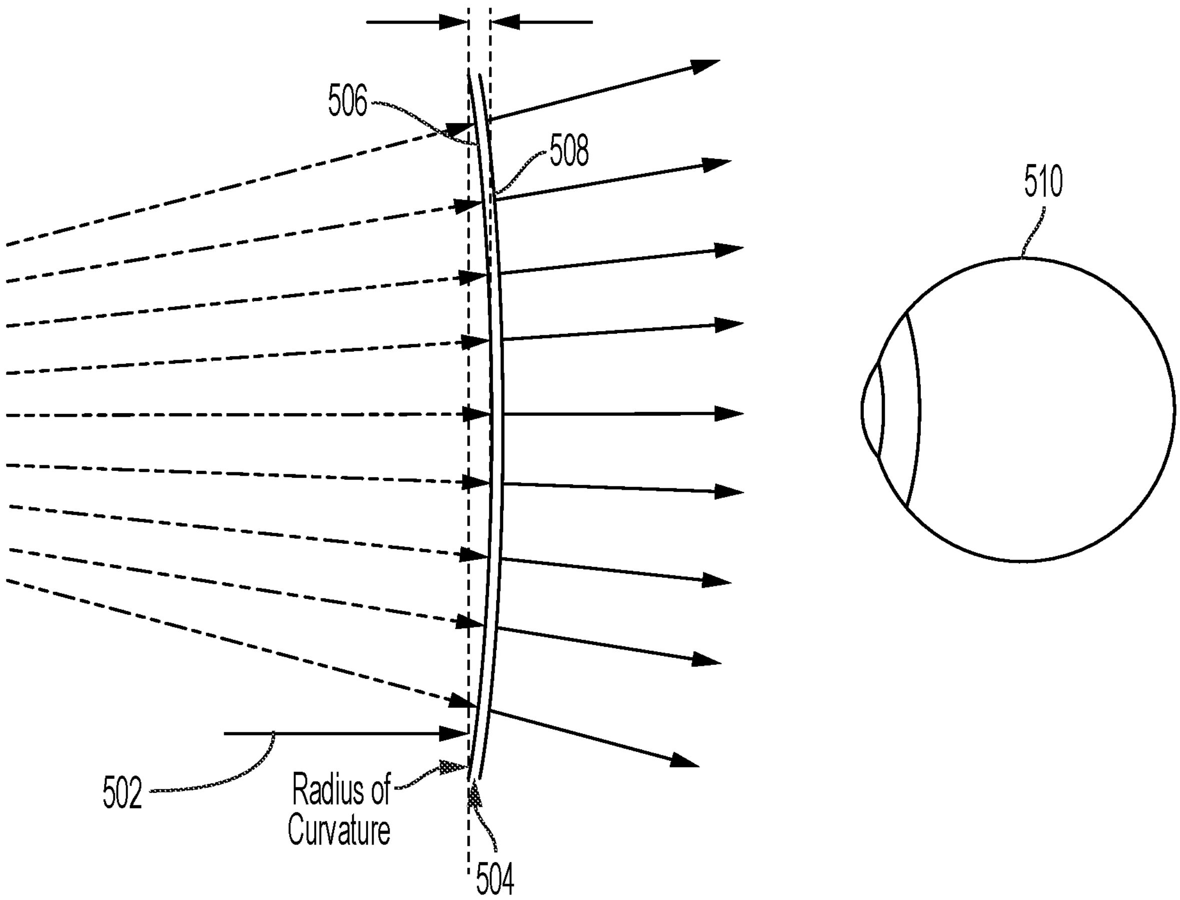
FIGS. 5A-5B illustrate an exemplary waveguide layer, according to embodiments of the disclosure.
Figure 5B:
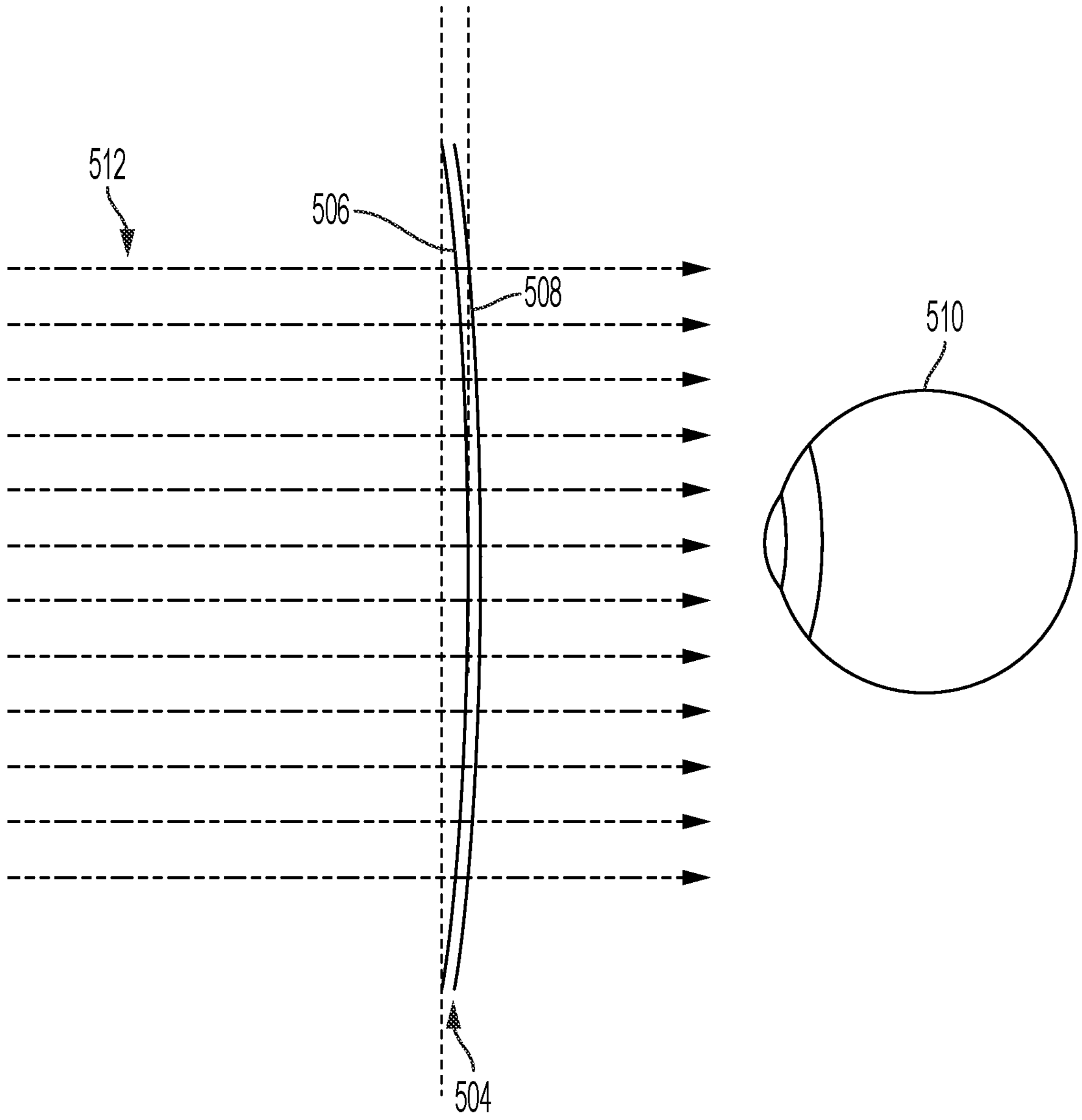

FIGS. 5A-5B illustrate an exemplary waveguide layer, according to embodiments of the disclosure. FIG. 5A is a simplified cross-sectional view of a waveguide layer of an eyepiece and light projected from the waveguide layer when the waveguide layer is characterized by a predetermined curvature according to some embodiments. The waveguide layer 504 may be a waveguide layer created using the methods described herein. As illustrated in FIG. 5A, a surface profile characterizes waveguide layer 504. In some embodiments, the surface profile forms a curve, which can be defined by a radius of curvature for a spherical curvature. In some embodiments, the surface profile is aspheric, but can be approximated by a spherical surface shape. Because of the structure of waveguide layer 504, input surface 506 can be substantially parallel to output surface 508 throughout the length of waveguide layer 504.

As light propagates through waveguide layer 504 by total internal reflection (TIR), output light is diffracted out of waveguide layer 504 as illustrated by output rays. For low levels of curvature, input surface 506 and output surface 508 are substantially parallel to each other at positions across the waveguide layer. Accordingly, as light propagates through the waveguide layer by TIR, the parallel nature of the waveguide surfaces preserves the reflection angles during TIR so that the angle between the output ray and the output surface is preserved across the waveguide layer. Since the surface normals vary slightly across the curved waveguide layer output surface, the output rays also vary slightly, producing the divergence illustrated in FIG. 5A.

The divergence of output rays resulting from the curvature of output surface 508 can have the effect of rendering input light beam 502 so that it appears that light originates from a point source positioned at a particular distance behind waveguide layer 504. Accordingly, the surface profile or curvature of waveguide layer 504 produces a divergence of light toward the user's or viewer's eye 510, effectively rendering the light as originating from a depth plane positioned behind the waveguide layer with respect to the eye.

The distance from the waveguide layer at which the input light beam appears to originate can be associated with the radius of curvature of waveguide layer 504. A waveguide with a higher radius of curvature can render a light source as originating at a greater distance from waveguide layer than a waveguide with a lower radius of curvature. For example, as shown in FIG. 5A, waveguide layer 504 may have a radius of curvature of 0.5 m, which can be achieved, e.g., by a bowing of waveguide layer 504 by 0.4 mm across an EPE having a lateral dimension (e.g., length or width) of 40 mm. Given this example curvature of waveguide layer 504, input light beam 502 appears to originate at a distance of 0.5 m from waveguide layer 504. As another example, another waveguide layer can be operated to have a radius of curvature of 0.2 m, rendering a light source that appears to a user to be originating at a distance of 0.2 m from the waveguide layer. Accordingly, by utilizing a small amount of curvature, i.e., fractions of a millimeter of bow across a waveguide layer tens of millimeters in length/depth, which is compatible with waveguide layer materials, depth plane functionality can be implemented for two-dimensional expansion waveguides, also referred to as two-dimensional waveguides. The curvatures utilized according to embodiments of the present invention can be used in a variety of commercial products, including sunglasses, which can have several millimeters (e.g., 1-5 mm) of bow, vehicle windshields, and the like. Accordingly, the small amount of curvature utilized in various embodiments of the present invention will not degrade the optical performance of the eyepiece; for instance, examples can introduce less than 0.1 arcminute of blur at center field of view and less than 2 arcminutes of blur across the field of view of an eyepiece with 0.5 m radius of curvature.

FIG. 5A only illustrates a one-dimensional cross-sectional view of waveguide layer 504, which is an element of an eyepiece. However, it will be appreciated that the surface profile imposed on the waveguide layer can also be imposed in the direction orthogonal to the plane of the figure, resulting in a two-dimensional curvature of the waveguide layer. Embodiments of the present invention thus provide depth plane functionality to the structure of the eyepiece, particularly, the waveguide layers of the eyepiece. As described herein the depth plane functionality can be bimodal or continuous depending on the particular implementation.

FIG. 5B is a simplified cross-sectional view of a waveguide layer of an eyepiece and light passing through the waveguide layer when the waveguide layer is characterized by a predetermined curvature according to some embodiments. As described with respect to FIG. 5A, light projected from the waveguide layer 504 can cause a light source to appear to an eye of a user in a three-dimensional space. Real-world light 512, or light not projected through waveguide layer 504 for the purposes of virtual reality (VR), augmented reality (AR), or mixed reality (MR), can pass through input surface 506 and output surface 508 of waveguide layer 504 and towards eye 510 of a user. A waveguide with low thickness variation (e.g., less than 1.0 μm) has negligible optical power and can allow real world light 512 to pass through the curved surface of waveguide layer 504 with little or no disturbance. In some embodiments, no correction of real-world light is required, and there is reduced or no off-axis degradation of real-world light caused by the surface profile of waveguide layer 504. Thus, the imposition of a surface profile or curvature on the waveguide layer allows for the projection of virtual content from positions at a distance from the eyepiece while maintaining the integrity of real-world light, thereby allowing both real-world light to be viewed by a user and, concurrently, virtual content to be rendered for the user in real-time in three-dimensional space.

In some embodiments, a radius of curvature of the waveguide layer, which can be a polymer waveguide layer, can be dynamically varied between a first distance (e.g., 0.1 m) and infinity, which can dynamically vary the depth planes (i.e., the distance at which a projected light source appears to be rendered) of the eyepiece as well between the first distance and infinity. Thus, embodiments of the present invention enable variation of depth planes between the first distance (e.g., 0.1 m) and infinity, which includes depth planes typically utilized in augmented or mixed reality applications. The surface profile of the waveguide layers, e.g., flexible polymer waveguide layers, can be adjusted using various methodologies and mechanisms as described in more detail herein.

In some embodiments, dynamic eyepieces are provided in which a depth plane of the eyepiece can be varied to display virtual content at different depth planes, for example, temporal variation as a function of time. Accordingly, subsequent frames of virtual content can be displayed, appearing to originate from different depth planes. However, static implementations are also included within the scope of the present invention. In these static implementations, a fixed and predetermined surface profile or curvature characterizes the waveguide layers of the eyepiece, thereby presenting the virtual content at a fixed depth plane. In contrast with some systems utilizing external lenses, diffractive lenses, or other optical elements, embodiments utilizing a static implementation can implement a depth plane through curvature of the waveguide layers, reducing system complexity, and improving optical quality. Moreover, some embodiments can implement a set of eyepieces, each eyepiece including a stack of curved waveguide layers to provide two static depth planes. As an example, a first stack of three curved waveguide layers could utilize a bow of 0.2 mm across the width/length of the waveguide stack to implement a three-color scene at a depth plane positioned at 1 m and a second stack of three curved waveguide layers could utilize a bow of 0.4 mm across the width/length of the waveguide stack to implement a second three-color scene at a depth plane positioned at 0.5 m. Other suitable dimensions are within the scope of the present invention. In addition, binocular systems as well as monocular systems are contemplated.

In some embodiments, disclosed waveguides are as described in U.S. Patent Publication No. US2021/0011305, the entire disclosure of which is herein incorporated by reference. The disclosed waveguides may enhance presentation of images (e.g., mixed reality (MR) content) to a user by improving optical properties in a cost-effective manner.

Therefore, it may be desirable to create micro-patterns or nano-patterns on curved surfaces, for example, to fabricate curved waveguides for MR applications and to achieve the advantages described above, or to create antireflective features on a curved optical structure (e.g., a curved lens with antireflective features). The process of creating micro-patterns or nano-patterns on curved surfaces may not be straightforward. Embodiments of the disclosure describe patterning mechanisms and/or parameters for efficiently creating these patterns on a curved surface.

For example, using a nanoimprint lithography process (e.g., J-FIL) with a coated resist template (CRT) (e.g., a superstrate comprising a template for creating a desired pattern) on flexible plastic, glass web, or sheet may overcome process barriers experienced in conventional processes (e.g., by allowing ability to control volume of the patterning material). Using a nanoimprint lithography process such as J-FIL and a flexible CRT (e.g., glass, plastic, a sheet), as disclosed herein, advantageously allow (1) a material of varying material index and/or volume to be dispensed across any area of a curved surface, and/or (2) a mold (e.g., a thin flexible mold) to conform directly to a surface (e.g., a curved surface) using capillary forces. The capillary forces may be imparted to a thin, controlled volume resist fluid coating, allowing formation of micro-patterns and/or nano-patterns on varying TTV surfaces.

The magnitude of the fluid capillary forces (e.g., associated with the patterning material) may be affected by fluid flow, time of flow, and/or fluid resistance. Fluid mechanics equations may describe these forces and thereby, contact-based imprint principles. The Young-Laplace equation with boundary conditions applied between two surfaces (e.g., between a curved surface and a superstrate) with a patterning material (e.g., resist fluid) and air as media is described in equation (1).

$$F = \frac{2wl\gamma\cos\theta}{d} \tag{1}$$

As described in equation (1), force acting on each surface is directly proportional to an area of patterning material interaction between the two surfaces. The area may have a width, w, and length, l. $\gamma_r$ may be patterning material (e.g., resist) surface tension in air. The force is inversely proportional to the distance, d, between the two surfaces. In some instances, the distance parameter, d, is of importance as it may dictate the magnitude of force acting on the surfaces. The control of the distance parameter may be dictated by process type for dispensing the patterning material in a specific condition.

Using the Young-Laplace equation and the Navier-Stokes equation for incompressible laminar flow, a time required for capillary fill for a given patterning material may be described in equation (2).

$$t = \frac{3\mu l^2}{d\gamma\cos\theta} \tag{2}$$

Equation (2) may be further used to understand a magnitude of flow velocity of the laminar flow. The Reynolds number may be calculated, which is the ratio of inertial force over viscous force. For example, the Reynolds number for such flow is at about $10^{-5}$, and thus the flow is considered laminar.

Equations (1) and (2) may provide a generalized approximate trend as shown in Table 1. Table 1 shows exemplary forces exerted on a surface based on change in patterning material (e.g., resist fluid) contact angle (wetting (e.g., less than 5 degrees) vs. non-wetting (e.g., greater than 5 degrees)) and volume/thicknesses for a given material surface tension at 30 mN/m. Specifically, Table 1 shows forces in Newtons over a 1 mm×1 mm unit area exerted due to capillary wetting for resist with varying ultra-low volume filling and for resist with varying contact angles.

TABLE 1

| | | Gap between surfaces (nm) | | | | | | | | | |
|---|---|---|---|---|---|---|---|---|---|---|---|
| | | 25 | 50 | 75 | 100 | 125 | 150 | 175 | 200 | 225 | 250 |
| Contact angle in degrees | 0 | 2.400 | 1.200 | 0.800 | 0.600 | 0.480 | 0.400 | 0.343 | 0.300 | 0.267 | 0.240 |
| | 5 | 2.391 | 1.195 | 0.797 | 0.598 | 0.478 | 0.398 | 0.342 | 0.299 | 0.266 | 0.239 |
| | 10 | 2.364 | 1.182 | 0.788 | 0.591 | 0.473 | 0.394 | 0.338 | 0.295 | 0.263 | 0.236 |
| | 15 | 2.318 | 1.159 | 0.773 | 0.580 | 0.464 | 0.386 | 0.331 | 0.290 | 0.258 | 0.232 |
| | 20 | 2.255 | 1.128 | 0.752 | 0.564 | 0.451 | 0.376 | 0.322 | 0.282 | 0.251 | 0.226 |
| | 25 | 2.175 | 1.088 | 0.725 | 0.544 | 0.435 | 0.363 | 0.311 | 0.272 | 0.242 | 0.218 |
| | 30 | 2.078 | 1.039 | 0.693 | 0.520 | 0.416 | 0.346 | 0.297 | 0.260 | 0.231 | 0.208 |
| | 35 | 1.966 | 0.980 | 0.655 | 0.491 | 0.393 | 0.328 | 0.281 | 0.246 | 0.218 | 0.197 |
| | 40 | 1.839 | 0.919 | 0.613 | 0.460 | 0.368 | 0.306 | 0.263 | 0.230 | 0.204 | 0.184 |

Table 1 highlights the importance of a patterning material (e.g., a wetting resist fluid) that is capable of being dispensed at low volumes (e.g., corresponding to a thickness less than 50 nm) to achieve high capillary force exerted on surfaces (e.g., greater than or equal 1N per square mm). That is, dispensing the patterning material at a thickness less than 50 nm may achieve capillary forces exerted on surfaces greater than or equal to 1N per square mm. Achieving a high capillary force may allow micro-patterns or nano-patterns to be more efficiently created on curved surfaces, as described in more detail herein.

In some embodiments, the patterning material is a nano-imprint resist that (1) has good wetting characteristics for filling and/or for volume dispense control and/or (2) requires low release force upon curing. For example, the patterning material can be a resist used in J-FIL type processes, where the resist has low viscosity (e.g., less than 20 cP), low contact angle with Si and SiO2 type surfaces (e.g., less than 20 degrees), and a surface tension of around 30 mN/m. As illustrated in Table 1, these conditions may allow for high capillary forces. For example, to provide the low volumes for achieving the high capillary forces, an inkjet is used to dispense less than 500 nL volume of resist over large areas (e.g., 50 mm×50 mm); on average, a drop of less than 6 pL in size is dispensed over a square grid of 180 μm×180 μm.

In some embodiments, the patterning material (e.g., resist fluid) is deposited using inkjetting, which may result in lower surface tension, compared to spincoating or slot-die coating. For example, the lower surface tension may allow the patterning material to spread and fill (e.g., spread and fill a template) faster, compared to spincoated material, which may evaporate. Using inkjetting, the patterning material is advantageously kept in its desired material state and at a lower viscosity, reducing viscous forces. As a result, a lower viscous forces may increase capillary fill time, advantageously increasing capillary force exerted over a large area for imprinting. Additionally, the lower surface tension and lower viscosity of resist material in fluid form achieved by inkjetting may reduce patterning defects such as de-wetting, non-fill, or underfill.

The contact angle and wetting characteristic of the resist, which, as described above, affects capillary force exerted, may be affected by nano-geometry type and the resist's density compared to a blank surface when the resist is in contact. An area comprising nano-channels may help flow of a fluid (e.g., patterning material) in a particular direction. By helping flow of the fluid, the spreading of the patterning material (e.g., resist) may be increased. By increasing spreading, the fluid between the two surfaces (e.g., superstrate and substrate) sandwiching the fluid may be reduced. Reducing the fluid between the two sandwiching surfaces may increase the force (e.g., capillary force) keeping the two surfaces in contact, as described above. As described in more detail herein, methods of applying increased force between two surfaces allow micro-patterns or nano-patterns to be more effectively and reliably created on a curved surface.

FIGS. 6A-6D illustrate exemplary nano-channel arrangements, according to embodiments of the disclosure. Although the nano-channel arrangements are described with respect to a flat surface, it is understood that the arrangements may be used for a curved surface. For example, the nano-channel arrangements described with respect to FIGS. 6A-6D may be included on the curved surfaces described with respect to FIGS. 7-12. Although the nano-channel arrangements are described as having a specific pitch and angle, it is understood that the described geometries are exemplary. The geometry of the nano-channel arrangements over a surface may vary over a surface, depending on spreading requirements (e.g., to achieve a desired capillary force at a specific location).

Figures 6A, 6B, 6C, 6D:
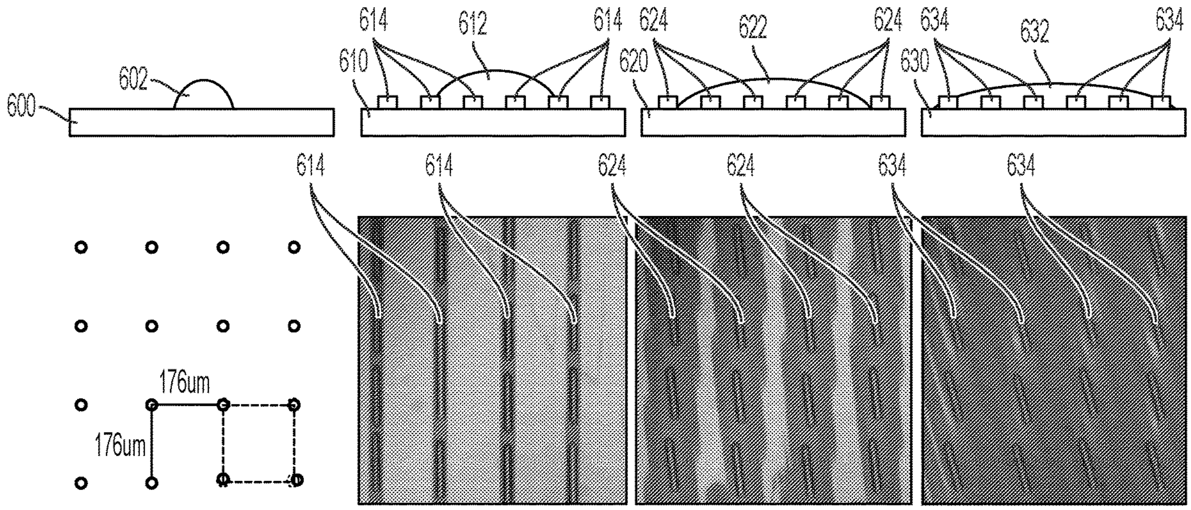
FIGS. 6A-6D illustrate exemplary nano-channel arrangements, according to embodiments of the disclosure.

FIG. 6A illustrates a side view and a top-down view of a substrate 600 that does not include a nano-channel. As illustrated, compared to arrangements described with respect to FIGS. 6B-6D, the patterning material 602 (e.g., a resist fluid) does not spread as widely across the substrate 600. In some examples, the patterning material may be dispensed at distances 176 μm apart, as illustrated.

FIG. 6B illustrates a side view and a top-down view of a substrate 610 that includes nano-channel arrangement 614. In some embodiments, the nano-channel arrangement 614 has a pitch (e.g., a spacing between two adjacent lines of a nano-channel arrangement) and an angle. For example, the nano-channel arrangement 614 has a 50-500 nm pitch, a line width of 10-400 nm, a height of 10-500 nm, and an angle of zero degree relative to an axis of the substrate 610. The nano-channel arrangement 614 advantageously improves patterning material filling speed. As illustrated, compared to arrangements described with respect to FIG. 6A, the patterning material 612 (e.g., a resist fluid) spreads more widely across the substrate 610 to create a thinner patterning material layer.

FIG. 6C illustrates a side view and a top-down view of a substrate 620 that includes nano-channel arrangement 624. In some embodiments, the nano-channel arrangement 624 has a pitch (e.g., a spacing between two adjacent lines of a nano-channel arrangement) and an angle. For example, the nano-channel arrangement 624 has a 50-500 nm pitch, a line width of 10-400 nm, a height of 10-500 nm, and an angle of 12 degrees relative to an axis of the substrate 620. The nano-channel arrangement 624 advantageously improves patterning material filling speed. As illustrated, compared to arrangements described with respect to FIGS. 6A and 6B, the patterning material 622 (e.g., a resist fluid) spreads more widely across the substrate 620 to create a thinner patterning material layer.

FIG. 6D illustrates a side view and a top-down view of a substrate 630 that includes nano-channel arrangement 634. In some embodiments, the nano-channel arrangement 634 has a pitch (e.g., a spacing between two adjacent lines of a nano-channel arrangement) and an angle. For example, the nano-channel arrangement 634 has a 50-500 nm pitch, a line width of 10-400 nm, a height of 10-500 nm, and an angle of 22 degrees relative to an axis of the substrate 630. The nano-channel arrangement 634 advantageously improves patterning material filling speed. As illustrated, compared to arrangements described with respect to FIGS. 6A-6C, the patterning material 632 (e.g., a resist fluid) spreads more widely across the substrate 630 to create a thinner patterning material layer.

The described nano-channel arrangements may improve patterning material filling speed (compared to a surface without the nano-channel arrangements), reducing gap thickness occupied by the patterning material and exerting more capillary force when interacting between two surfaces (e.g., two curved surfaces; a curved substrate and a curved superstrate). In some embodiments, by using a nano-channel arrangement with a same pitch as its width (i.e., a 50% spatial periodicity), micro-patterns or nano-patterns may be improve (e.g., by two times) the capillary hold for a given fill volume (assuming no non-fill voids).

FIGS. 7A-7F illustrate fabrication of exemplary patterns on a curved surface, according to embodiments of the disclosure. For example, FIGS. 7A-7F illustrate a process of J-FIL and use of flexible CRT for micro-patterning or nano-patterning over curved substrates. Although the curved surface is illustrated as having a particular convexity and curvature (e.g., a particular radius of curvature), it is understood that the illustrated convexity and curvature are exemplary. In some embodiments, using the disclosed processes, patterns may be created on a convex or concave curved surface having a different curvature. Although the patterns are illustrated across one dimension, it is understood that the patterns may be created across more than one dimension.

Figure 7A:
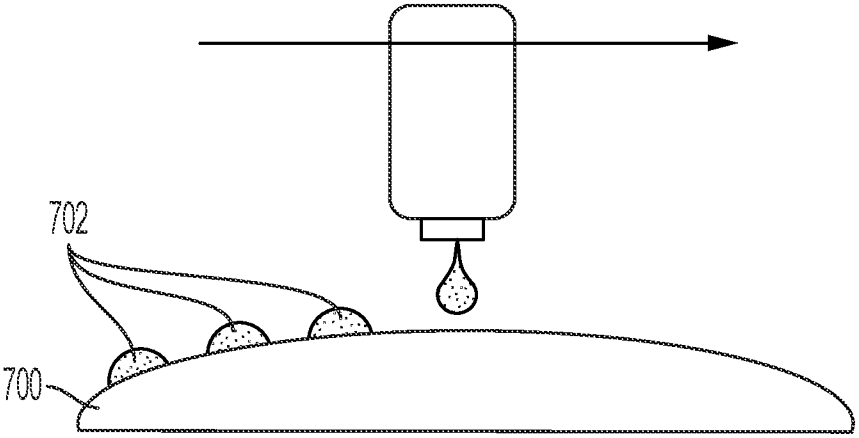
FIGS. 7A-7F illustrate fabrication of exemplary patterns on a curved surface, according to embodiments of the disclosure.

FIG. 7A illustrates patterning material 702 being deposited over a curved surface 700. In some embodiments, the patterning material 702 is a resist fluid (e.g., a UV curable resist), and the patterning material 702 is deposited using inkjetting, as described herein. In some embodiments, the volume of each deposit is precisely controlled (e.g., to achieve a desired thickness and capillary force). For the sake of brevity, descriptions and advantages of inkjetting are not repeated here. In some embodiments, the curved surface 700 has a height of less than 20 mm from its center to edge. It is understood that the patterning material 702 may be deposited in different sequences (e.g., all drops at a same time, one at a time, more than one drop at a time).

In some embodiments, the curved surface 700 includes nano-channel arrangements, as described with respect to FIGS. 6A-6D. The nano-channel arrangements advantageously allow the patterning material 702 to spread over a wider area, allowing the thickness of the patterning material to be reduced and achieving a greater capillary force for creating a desired pattern.

In some embodiments, locations of the patterning material 702 deposits correspond to a desired pattern (e.g., a micro-pattern, a nano-pattern). For example, a center of a deposited patterning material corresponds to periodicity of a desired pattern (e.g., a pattern pitch) to be molded by a superstrate. Specifically, the locations of the deposits may allow a sufficient capillary force to be applied (as described with respect to equations (1) and (2) and Table 1) for effectively and reliably creating the desired pattern using a CRT. In turn, the desired pattern may become an imprint or a mold for creating optical patterns on a curved optical element (e.g., optical patterns on a curved waveguide, antireflective features on a curved optical element).

Figure 7B:
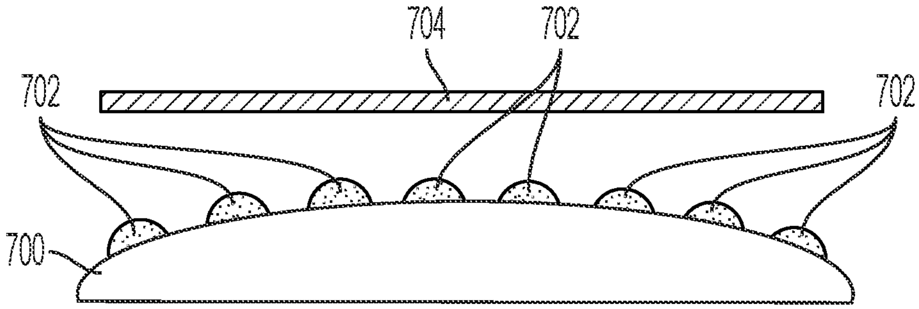

FIG. 7B illustrates the patterning material 702 deposited over the curved surface 700 and a superstrate 704. In some embodiments, as illustrated, the deposited patterning material 702 locations correspond a desired pattern (e.g., a micro-pattern, a nano-pattern) to be molded by a superstrate. In some embodiments, the superstrate 704 is a CRT, and the CRT molds the patterning material 702 into a desired pattern. For example, the CRT is a flexible CRT comprising PC or polyethylene terephthalate (PET) and having a 50-550 μm thickness. In some embodiments, the superstrate 704 has an elastic modulus E that is less than 10 GPa (e.g., at a thickness of 50-550 μm).

Figure 7C:
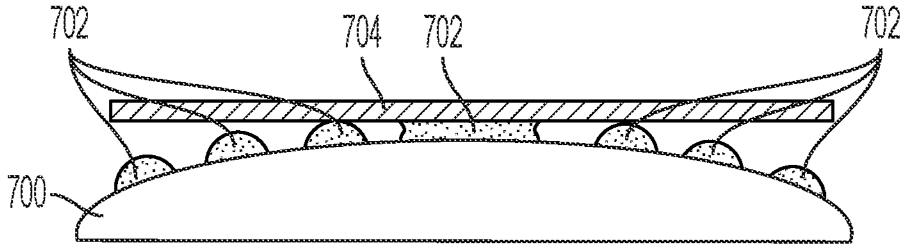

FIG. 7C illustrates the superstrate 704 being applied over the patterning material 702 and the curved surface 700. The superstrate 704 may mold the patterning material 702 into a desired pattern. In some embodiments, a capillary force on the patterning material 702 is created due to its interaction with the surfaces of the curved surface 700 and superstrate 704. For example, the capillary force may be described with respect to equations (1) and (2) and Table 1. In some embodiments, due to the nano-channel arrangements and the superstrate properties, the thickness of the patterning material may be reduced, and a stronger capillary force may be achieved to effectively and reliably create a desired micro-pattern or nano-pattern over a curved surface (e.g., a sufficient force may be applied to allow the CRT to effectively and reliably create a desired pattern on the patterning material 702). Exemplary processes for positioning the superstrate 704 are described in more detail with respect to FIG. 9.

Referring back to Table 1, the force magnitude per unit 1 mm×1 mm area may be important while considering a type of superstrate (e.g., CRT) to use for forming an enclosed space filled with the patterning material of a particular volume. For example, these considerations include bending ability of a superstrate and/or maximum deflection of the superstrate due to the bending.

The Euler-Bernoulli beam equation, shown in equation (3), may give an idea of the deflection achieved and/or force required to bend a certain distance for a certain superstrate (e.g., CRT) material type with a specific thickness.

$$D_c = \frac{q \cdot L^4}{8EI} \tag{3}$$

Equation (3) may be used to determine a type of superstrate or CRT to use for forming the enclosed space and creating micro-patterns or nano-patterns, as described herein. In equation (3), q is a constant force over a length L (e.g., length of the superstrate) on a material (e.g., superstrate material) with an elastic modulus E and second moment of area at an axis perpendicular to the loading I. The result of equation (3) yields a maximum deflection $D_C$ at a center (e.g., of the CRT). The equation may represent a slice from edge to center, for example, of a spherical imprint (e.g., a lens type profile).

Using equation (3) and understanding the capillary force exerted for holding the curvature (e.g., relationships from Table 1), Table 2 shows that a sub-250 nm resist volume thicknesses may be held. Specifically, Table 2 shows a maximum deflection, in mm, over a 20 mm length of Polycarbonate (PC) based CRT at 50-550 μm thickness with different force exerted, based on Table 1, with specific resist gap thickness and resist contact angle:

TABLE 2

| | | Gap between surfaces (nm) | | | | | | | | | |
|---|---|---|---|---|---|---|---|---|---|---|---|
| | | 25 | 50 | 75 | 100 | 125 | 150 | 175 | 200 | 225 | 250 |
| Contact angle in degrees | 0 | 10.496 | 5.248 | 3.499 | 2.624 | 2.099 | 1.749 | 1.499 | 1.312 | 1.166 | 1.050 |
| | 5 | 10.456 | 5.225 | 3.485 | 2.614 | 2.091 | 1.743 | 1.494 | 1.307 | 1.162 | 1.046 |
| | 10 | 10.336 | 5.168 | 3.445 | 2.584 | 2.067 | 1.723 | 1.477 | 1.292 | 1.148 | 1.034 |
| | 15 | 10.138 | 5.069 | 3.379 | 2.534 | 2.028 | 1.690 | 1.448 | 1.267 | 1.126 | 1.014 |
| | 20 | 9.863 | 4.931 | 3.288 | 2.466 | 1.973 | 1.644 | 1.409 | 1.233 | 1.096 | 0.986 |
| | 25 | 9.512 | 4.756 | 3.171 | 2.379 | 1.902 | 1.585 | 1.359 | 1.189 | 1.057 | 0.951 |

TABLE 2-continued

| | Gap between surfaces (nm) | | | | | | | | | |
|---|---|---|---|---|---|---|---|---|---|---|
| | 25 | 50 | 75 | 100 | 125 | 150 | 175 | 200 | 225 | 250 |
| 30 | 9.089 | 4.545 | 3.030 | 2.272 | 1.818 | 1.515 | 1.298 | 1.136 | 1.010 | 0.909 |
| 35 | 8.598 | 4.299 | 2.866 | 2.149 | 1.720 | 1.433 | 1.228 | 1.075 | 0.955 | 0.860 |
| 40 | 8.04 | 4.020 | 2.680 | 2.010 | 1.608 | 1.340 | 1.149 | 1.005 | 0.893 | 0.804 |

Figure 7D:
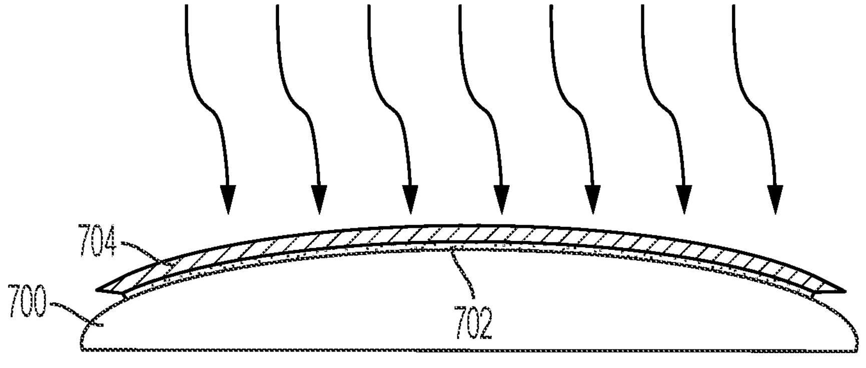

FIG. 7D illustrates the patterning material 702 being cured after the superstrate 704 is applied over the patterning material 702 and the curved surface 700. For example, the patterning material 702 is a UV curable resist, the patterning material 702 is cured using UV light, and a pattern is created on the patterning material 702 based on the superstrate's pattern. In some embodiments, after the superstrate 704 is applied and while the patterning material 702 is curing, forces are applied across the patterning material due to volume of the patterning material deposits, spreading of the patterning material (e.g., caused by nano-channel arrangements on the curved surface), and/or or a thickness of the patterning material (e.g., based on superstrate properties, spreading, and/or application of the superstrate). The applied forces may be a sufficiently large force that allows a desired pattern to be effectively and reliably formed over a curved surface and under the superstrate.

Figure 7E:
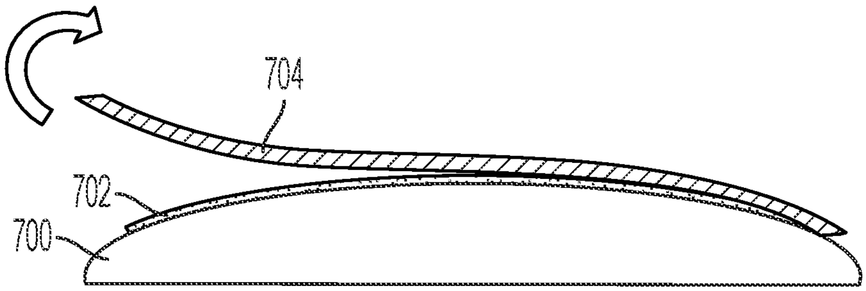

FIG. 7E illustrates the superstrate 704 being removed after the patterning material 702 finishes curing. In some embodiments, the superstrate 704 is peeled off after the patterning material 702 finishes curing and a desired micro-pattern or nano-pattern is formed over the curved surface 700.

In some instances, template demolding may be relied on cured resist surface interaction with the template's surface (e.g., a superstrate's surface), pattern density, and complexity of pattern being created (e.g., re-entrant shapes, sloped sidewalls). The mold-release requirement from the superstrate may depend on adherence to a substrate type. In some embodiments, bonding of the patterning material to the substrate is enhanced chemically via additional covalent bonding.

Figure 7F:
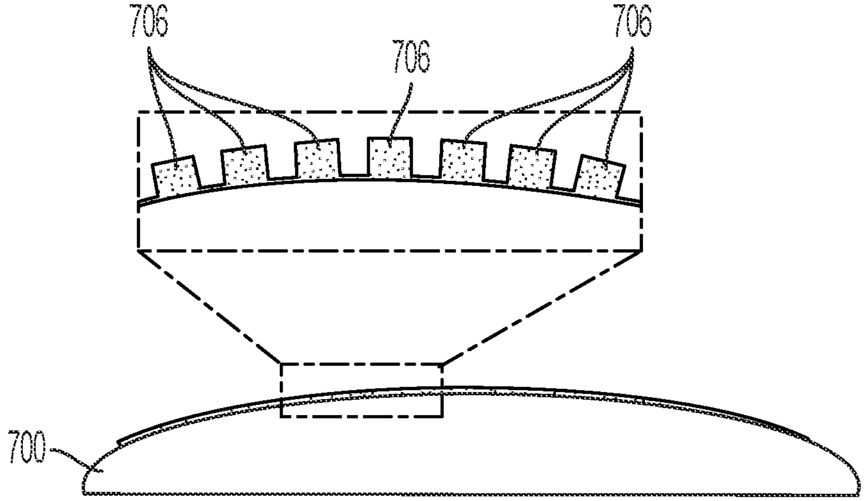

FIG. 7F illustrates pattern 706 created over the curved surface 700. In some embodiments, the pattern 706 is based on the superstrate's pattern and the forces acting on the patterning material 702 while the material was curing. For example, the forces are based on a volume of patterning material 702 being deposited, a spreading of the pattering material (e.g., caused by nano-channel arrangements on the curved surface), and/or a thickness of the patterning material (e.g., based on superstrate properties, spreading, and/or application of the superstrate).

In some embodiments, the pattern 706 may be used for creating antireflective features (e.g., antireflective nano-patterns) on a lens. For example, the pattern 706 may be part of a mold; a lens and its antireflective patterns may be advantageously formed with the mold (i.e., pattern 706) in one step (e.g., without antireflective film deposition). In some embodiments, the pattern 706 may be used (e.g., as a mold) for creating waveguide patterns (e.g., on curved glass, on curved plastic, on patterned Geometric Phase (GP) (e.g., based on Liquid Crystal material), meta-lens on curved substrates, waveguide or meta-lens pattern on curved substrates at a smaller form factor (e.g., contact lens)).

In some embodiments, the pattern 706 is coated with a release layer to form a pattern transfer surface (e.g., for releasing, when the pattern 706 is used as a mold). For example, the release layer coating comprises $SiO_2$, Au, Al, or $Al_2O_3$ with or without Fluorinated Siliane treatment (e.g., FOTS).

In some embodiments, the process described with respect to FIGS. 7A-7F advantageously allow micro-pattern or nano-pattern to be effectively and reliably created over a curved surface. By using the disclosed nano-channel arrangements, superstrate, and/or patterning material deposition process, a force for creating the pattern with the patterning material may be applied (e.g., a sufficiently strong capillary force for creating a desired pattern over a curved surface and under a superstrate).

In some embodiments, the pattern 706 is transferred into the curved surface via etch processes, such a Reactive Ion Etching (RIE), Inductively Coupled Plasma-RIE, Ion Beam Milling, and Etching using gases such a CHF3, CF3, SF6, Cl2, O2, Ar. The curved surface 700 may comprise material such as Fused Silica (SiO2), Quartz (SiO2), Chrome coated Fused Silica, Soda Lime. The etched pattern can also be transferred into a thin film deposited over the curved surface using Physical Vapor Deposition processes (e.g., evaporation, sputter) and/or Chemical Vapor Deposition processes (e.g., plasma-enhanced CVD, Atomic layer deposition). Such films can comprise Silicon Nitride (Si3N4), Silicon Oxy-Nitride, and Silicon Dioxide (SiO2). It should be appreciated that other processes, gases, and material may be used to transfer the pattern.

In some embodiments, the micro-patterns or nano-patterns may be varied across a curved area covered by the superstrate. In some embodiments, the type of resist dispensed may be varied across the curved area covered by the substrate (e.g., to vary surface tension, to vary viscosity, to change contact angle) to optimize capillary hold force for different curvature depths (e.g., for forming the varying micro-patterns or nano-patterns).

Figure 8A:
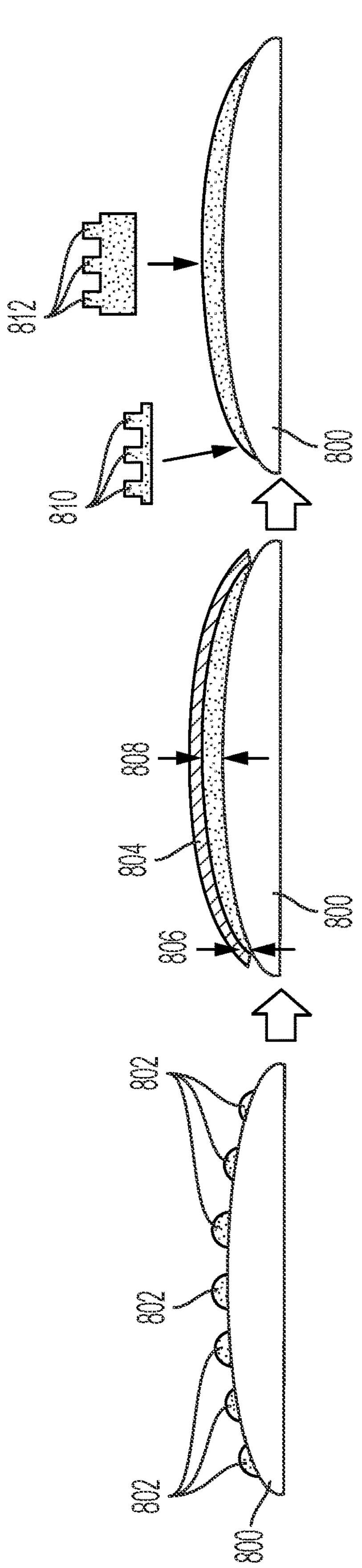
FIGS. 8A-8C illustrate fabrication of exemplary patterns on a curved surface, according to embodiments of the disclosure.
Figure 8B:
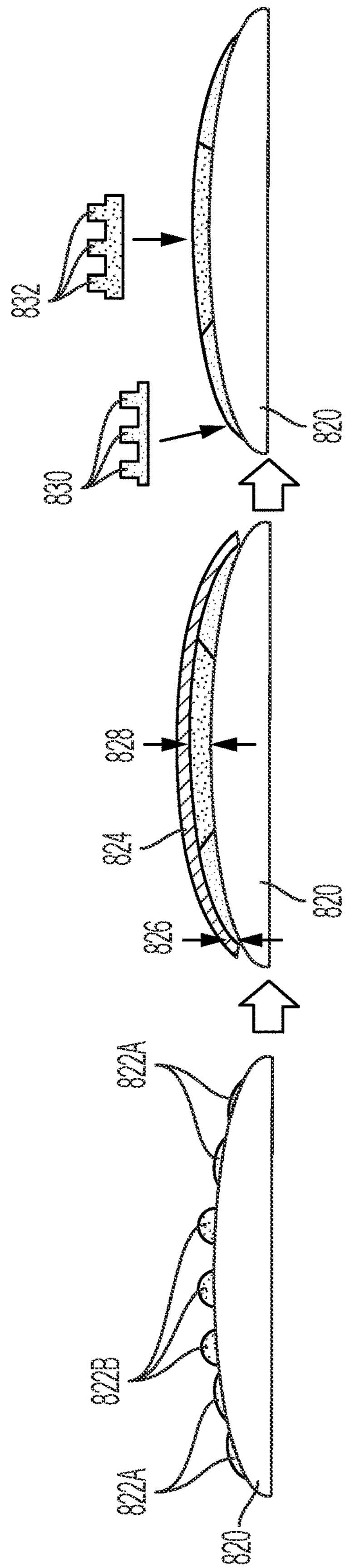
Figure 8C:
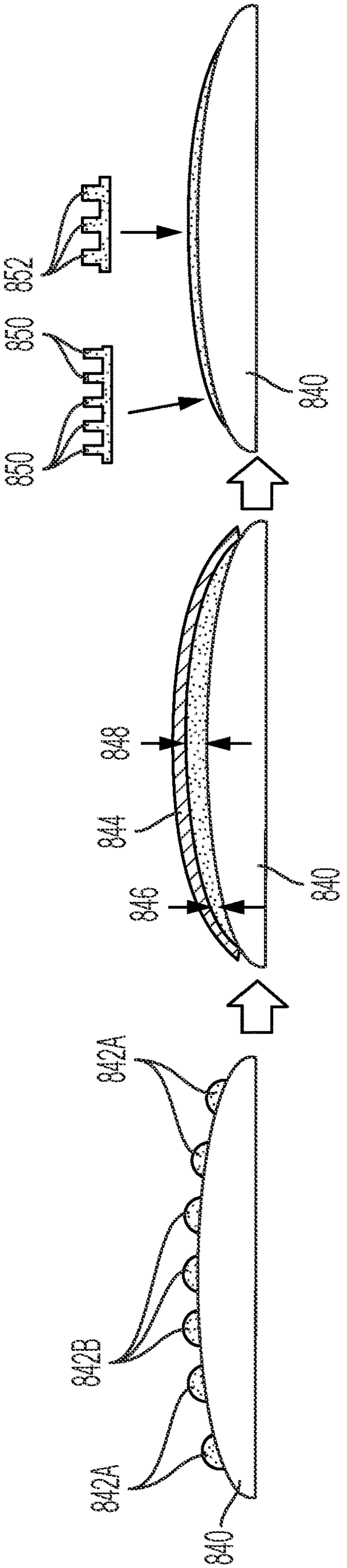

FIGS. 8A-8C illustrate fabrication of exemplary patterns on a curved surface, according to embodiments of the disclosure. Although the curved surface is illustrated as having a particular convexity and curvature (e.g., a particular radius of curvature), it is understood that the illustrated convexity and curvature are exemplary. In some embodiments, using the disclosed processes, patterns may be created on a convex or concave curved surface having a different curvature. Although the patterns are illustrated across one dimension, it is understood that the patterns may be created across more than one dimension. Although specific varying parameters are described, it is understood that other parameters may be varied to create a desired varying pattern. For the sake of brevity, steps, features, and advantages described with respect to FIGS. 7A-7F are not repeated here.

FIG. 8A illustrates patterning material 802 being deposited on curved surface 800. In some embodiments, as illustrated, volumes (e.g., 10 μL to 10 μL) of the deposition (e.g., using inkjetting) of the patterning material 802 varies across the curved surface 800. For example, volumes of deposition closer to an edge of the curved surface 800 may be smaller than volumes of deposition closer to a center of the curved surface 800.

Due to the varying volume, after the superstrate 804 is applied (e.g., ensuring proper bending and conformal coverage), a thickness across the patterning material 802 (e.g., a distance between the curved surface 800 and the superstrate 804 at a location across the patterning material) may vary. For example, as illustrated, volumes of deposition closer to an edge of the curved surface 800 being smaller than volumes of deposition closer to a center of the curved surface 800, a first thickness 806 closer to the edge of the curved surface 800 is thinner than a second thickness 808 closer to the center of the curved surface 800. As a result, pattern 810, which corresponds to the first thickness 806, is at a lower height relative to the curved surface 800, compared to pattern 812, which corresponds to the second thickness 808. The relationship between volume, thickness, and created pattern may be predicted as described with respect to equations (1) and (2) and Table 1.

FIG. 8B illustrates patterning material 822A and 822B being deposited on curved surface 820. In some embodiments, as illustrated, the depositions (e.g., using inkjetting) associated with patterning material 822A is spread differently, compared to the depositions associated with patterning material 822B. In some embodiments, the spreading is different because patterning material 822A comprises a different material than patterning material 822B.

For example, the different material may comprise a material with varying refractive index (e.g., a first material (e.g., patterning material 822A) having an index of 1.53 and a second material (e.g., patterning material 822B) having an index of 1.9). The first material may comprise UV curable polymers such as acrylates and vinyl esters. The second material may comprise Sulphur, aromatic molecule in the carbon chain, or a high-index nanoparticles such as $TiO_2$ and $ZrO_2$. More generally, in some embodiments, a patterning material disclosed herein comprises the first material, the second material, or both the first and second material.

In some embodiments, the spreading is different because nano-channel arrangements associated with patterning material 822A (e.g., nano-channel arrangements located on the curved surface where the corresponding material is deposited) and patterning material 822B are different. For example, the nano-channel arrangements associated with patterning material 822A allow the patterning material 822A to spread more, compared to the patterning material 822B.

Due to the varied spreading, after the superstrate 824 is applied, a thickness across the patterning material 822A and 822B (e.g., a distance between the curved surface 820 and the superstrate 824 at a location across the patterning material) may vary. For example, as illustrated, a first thickness 826 corresponding to the patterning material 822A is thinner than a second thickness 828 corresponding to the patterning material 822B. As a result, pattern 830, which corresponds to the patterning material 822A, is at a lower height relative to the curved surface 800, compared to pattern 832, which corresponds to the patterning material 822B. The relationship between volume, thickness, and created pattern may be predicted as described with respect to equations (1) and (2) and Table 1.

FIG. 8C illustrates patterning material 842A and 842B being deposited on curved surface 840. In some embodiments, as illustrated, the patterning material 822A is deposited (e.g., using inkjetting) at different intervals, compared to the deposition locations of patterning material 842B. For example, the patterning material 842A is deposited between wider intervals (e.g., a larger gap between adjacent depositions) than the deposition of patterning material 842B. In some embodiments, the patterning material 824A and 824B comprise a same material.

Due to the varied deposition locations, after the superstrate 844 is applied, a thickness across the patterning material 842A and 842B (e.g., a distance between the curved surface 840 and the superstrate 844 at a location across the patterning material) may vary. For example, as illustrated, a first thickness 846 corresponding to the patterning material 842A is thinner than a second thickness 848 corresponding to the patterning material 842B.

The different thicknesses may correspond to different patterns being created by the superstrate 844. For example, the first thickness 846 may be a thickness for applying a sufficient force (e.g., based on equations (1) and (2) and Table 1) for creating pattern 850, and the second thickness 848 may be a thickness for applying a sufficient force for creating pattern 852. As a result, sufficient forces, corresponding to patterns to be created, are allowed to be applied based on the thicknesses. The force for creating pattern 850 may be greater than the force for creating pattern 852, and thus a thinner thickness is needed to apply a larger capillary force for creating the pattern 850. The relationship between volume, thickness, and created pattern may be predicted as described with respect to equations (1) and (2) and Table 1.

In some embodiments, the pattern created in FIGS. 8A-8C is coated with a release layer to form a pattern transfer surface (e.g., for releasing, when the pattern is used as a mold). For example, the release layer coating comprises $SiO_2$, Au, Al, or $Al_2O_3$ with or without Fluorinated Siliane treatment (e.g., FOTS).

Figure 9:
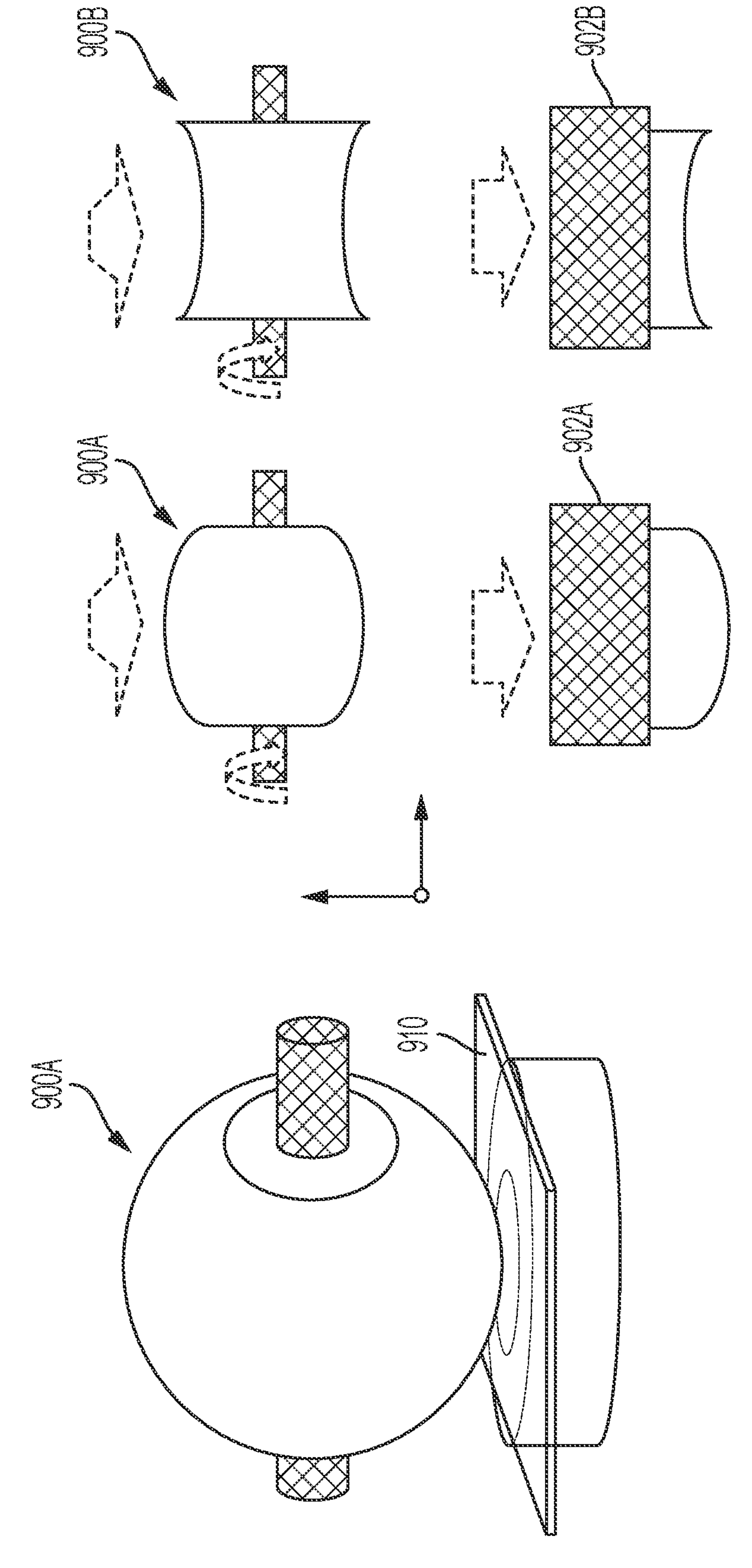
FIG. 9 illustrate exemplary force transfers for fabricating patterns on a curved surface, according to embodiments of the disclosure.

In some instances, to provide a necessary impetus for the superstrate (e.g., a flexible CRT) to bend and conform, the ability to initiate surface contact towards the curved surface with resist may be needed. FIG. 9 illustrate exemplary force transfers for fabricating patterns on a curved surface, according to embodiments of the disclosure. The force may be transferred to position a superstrate 910 onto a patterning material. For example, as described with respect to FIGS. 7A-7F and 8A-8C, the force may be applied by roller 900A or 900B or mechanism 902A or 902B to bend the superstrate (e.g., to achieve a desired superstrate curvature, and hence, desired distances between the superstrate and a curved surface) and initiate contact between the superstrate and the patterning material until capillary forces (e.g., based on patterning material properties and thickness and distances between the superstrate and the curved surface) holds the superstrate at its patterning position.

In some embodiments, a concave/convex push roller 900A or 900B (e.g., up-down, left-right) is used to provide the force for positioning the superstrate (e.g., by rolling the roller on top of the superstrate 910 to cause the superstrate 910 to contact the patterning material (beneath the superstrate) for forming the micro-patterns or nano-patterns described herein). In some embodiments, a compliant z-head mechanism 902A or 902B is used to provide the force for positioning the superstrate (e.g., with up-down movement to cause the superstrate 910 to contact the patterning material (beneath the superstrate) for forming the micro-patterns or nano-patterns described herein).

In some embodiments, a non-contact method such as using a pressurized inert gas, air, or creation of pressure difference (e.g., by creating lower pressure sections) may be used for creating a force for positioning a superstrate (e.g., flexible CRT) and forming specific micro-patterns or nano-patterns.

For example, using a disclosed process for contacting the superstrate with the patterning material, imprinting on a NBK-7 lens (n=1.53) with −1D power using a flexible CRT (e.g., a co-extruded PC or PET web/roll at 50-550 μm thickness) may be achieved over a curved surface having 50 mm in diameter. In this example, the flexible CRT may have a depth of curvature in the center of 600 μm with respect to an edge. When pushed against the curve surface using a disclosed process, the CRT advantageously conforms to and held the shape of the curvature. In some examples, the superstrate may have an additional benefit of planarizing any scratch or void (e.g., haze) on the curved surface.

FIGS. 10A-10E illustrate an exemplary application of patterns fabricated on a curved surface, according to embodiments of the disclosure. Although the curved surface is illustrated as having a particular concavity and curvature (e.g., a particular radius of curvature), it is understood that the illustrated concavity and curvature are exemplary. In some embodiments, using the disclosed processes, patterns may be created on a concave or convex curved surface having a different curvature. Although the patterns are illustrated across one dimension, it is understood that the patterns may be created across more than one dimension. For the sake of brevity, steps, features, and advantages described with respect to FIGS. 7-9 are not repeated here.

Figure 10A:
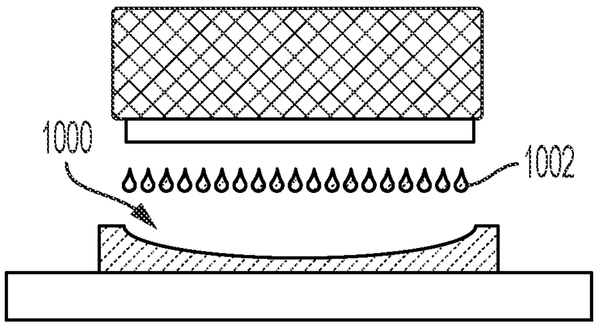
FIGS. 10A-10E illustrate an exemplary application of patterns fabricated on a curved surface, according to embodiments of the disclosure.

FIG. 10A illustrates patterning material 1002 being deposited over a curved surface 1000. The patterning material 1002 may include patterning material described with respect to FIGS. 7A-7F and 8A-8C. In some embodiments, the patterning material 1002 is a resist fluid (e.g., a UV curable resist), and the patterning material 1002 is deposited using inkjetting, as described herein. In some embodiments, the volume of each deposit is precisely controlled (e.g., to achieve a desired thickness and capillary force). For the sake of brevity, descriptions and advantages of inkjetting are not repeated here. It is understood that the patterning material 1002 may be deposited in different sequences (e.g., all drops at a same time, one at a time, more than one drop at a time).

Figure 10B:
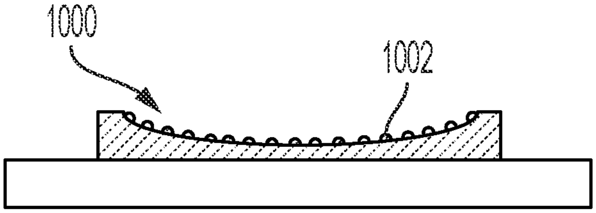
Figure 10C:
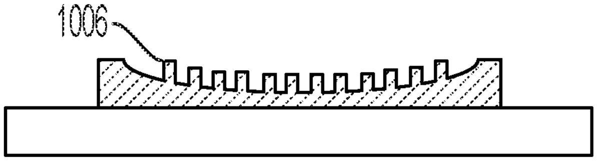

FIG. 10B illustrates the patterning material 1002 deposited over the curved surface 1000. In some embodiments, FIG. 10B illustrates the curved surface 1000 and the patterning material 1002 prior to application of a superstrate, as described with respect to FIGS. 7A-7F and 8A-8C. FIG. 10C illustrates pattern 1006 created over the curved surface 1000. The pattern 1006 may be created using a process as described with respect to FIGS. 7-9.

Figure 10D:
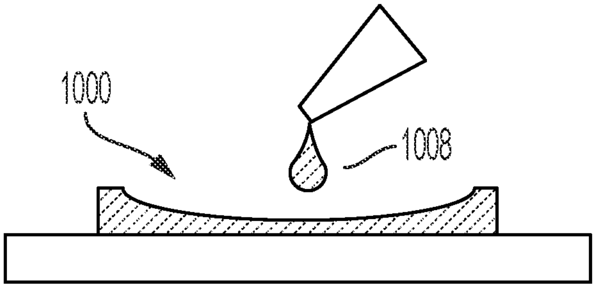

FIG. 10D illustrates patterning material 1008 being deposited over a curved surface 1000. The patterning material 1008 may include patterning material described with respect to FIGS. 7A-7F and 8A-8C. In some embodiments, the patterning material 1008 is a resist fluid (e.g., a UV curable resist), and the patterning material 1008 is deposited using a non-inkjet method, as an alternative to inkjetting (e.g., as described with respect to FIG. 10A). In some embodiments, the volume of each deposit is precisely controlled (e.g., to achieve a desired thickness and capillary force).

Figure 10E:
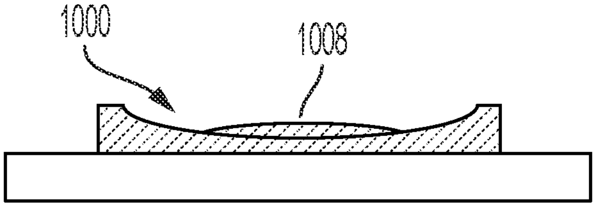

FIG. 10E illustrates the patterning material 1008 deposited over the curved surface 1000, using a non-inkjet method, as an alternative to inkjetting (e.g., as described with respect to FIG. 10B). In some embodiments, FIG. 10E illustrates the curved surface 1000 and the patterning material 1008 prior to application of a superstrate, as described with respect to FIGS. 7A-7F and 8A-8C. The patterning material 1008 may be used to form pattern 1006, using a process as described with respect to FIGS. 7-9 and as described with respect to FIG. 10C.

FIGS. 11A-11D illustrate an exemplary application of patterns fabricated on a curved surface, according to embodiments of the disclosure. Although the patterns are illustrated across one dimension, it is understood that the patterns may be created across more than one dimension.

Figure 11B:
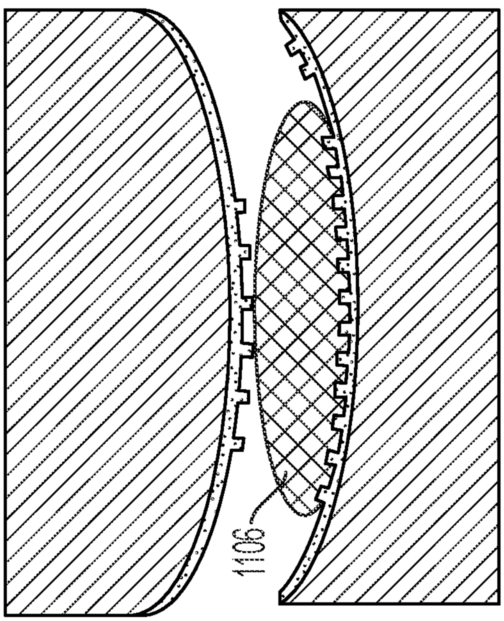
FIGS. 11A-11D illustrate an exemplary application of patterns fabricated on a curved surface, according to embodiments of the disclosure.
Figure 11A:
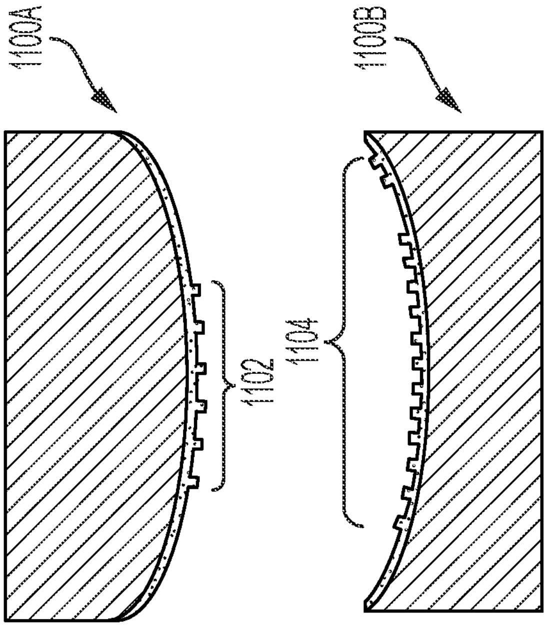

FIG. 11A illustrates a first mold 1100A and a second mold 1100B. The first mold 1100A comprises a first pattern 1102, and the second mold 1100B comprises a second pattern 1104. In some embodiments, different from the illustration, the first mold and the second mold are both be concaved or convex. In some embodiments, the pattern 1102 and/or the pattern 1104 are created using a process described with respect to FIGS. 7-9. In some embodiments, the pattern 1102 and/or pattern 1104 are coated with a release layer to form a pattern transfer surface (e.g., for releasing, when the pattern is used as a mold). For example, the release layer coating comprises $SiO_2$, Au, Al, or $Al_2O_3$ with or without Fluorinated Siliane treatment (e.g., FOTS).

FIG. 11B illustrates a material 1106 placed between the first mold 1100A and the second mold 1100B. In some embodiments, the material 1106 is a material for fabricating an optical structure (e.g., a waveguide, an optical structure having antireflective features). For example, the material 1106 is a curable waveguide resin.

In some embodiments, the material 1106 is molded between the first mold 1100A and the second mold 1100B. For example, the curable waveguide resin is molded between the two molds. The curvature of the two molds and the patterns 1102 and 1104 are determined based on a desired radius of curvature of an end product created by the molds 1100A and 1100B. For example, the desired radius of curvature is a desired waveguide radius of curvature, and the waveguide has a pattern corresponding to patterns 1102 and 1104. The curvature of the two molds may be created using a process described with respect to FIGS. 7-9.

Figure 11D:
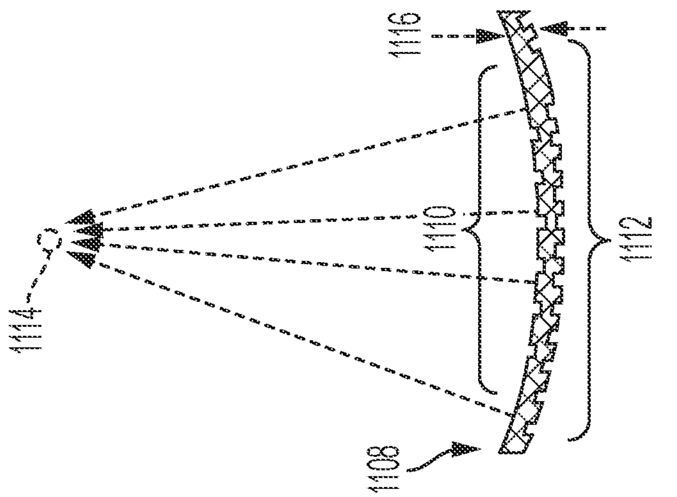
Figure 11C:
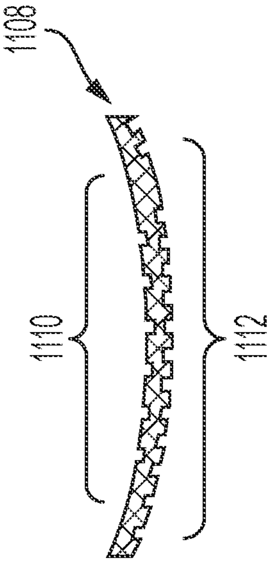

FIG. 11C illustrates an end product 1108. In some embodiments, the end product 1108 is a waveguide having a desired radius of curvature and patterns (e.g., first optical pattern 1110, second optical pattern 1112) enabling desired optical properties. In some embodiments, the first pattern 1102 corresponds to the first optical pattern 1110 (e.g., by molding the material 1106 into the first pattern 1102 to form the first optical pattern 1110), and the second pattern 1104 corresponds the second optical pattern 1112 (e.g., by molding the material 1106 into the second pattern 1104 to form the second optical pattern 1112).

In some embodiments, the first optical pattern 1110 and/or the second optical pattern in 1112 comprises one or a combination of the following: input coupling element to diffract incoming light from source into the substrate in total internal reflection; pupil expanding element, which helps direct and spread light towards diffractive elements near a user's eye; exit pupil or out-coupling element, which extracts light outwards from the user to generate a virtual image; or anti-reflective pattern for increase transmissivity.

In some embodiments, the end product 1108 is a refractive lens having antireflective features. As an example, a lens curvature may have a 20 mm radius aperture +/−1.25 D lens power with a 425 mm radius of curvature. The height or depth of the curvature is about 450 μm for a 1.53 index lens material, about 400 μm for a 1.65 index lens material, and above 350 μm for a 1.75 index lens material.

FIG. 11D illustrates a desired optical property associated with a pattern of the end product 1108. For example, the end product 1108 is a waveguide of an MR system (as described with respect to FIGS. 1-5), and the pattern 1110 corresponds to a focal point 1114 having a specific focal depth corresponding to an MR image. When MR content is being presented to a user, light source 1116 is optically coupled to the waveguide to provide light for presenting the MR content. The pattern 1110 improves the presentation of the MR image because it is configured to focus at the focal point 1114 corresponding to the MR image.

In some embodiments, the processes described with respect to FIGS. 7-9 allow the molds 1100A and 1100B to be created and the fabrication of the end product 1108 to be more feasible. As an exemplary advantage, the process described with respect to FIGS. 11A-11D to form an end product 1108 may be more efficient, compared to conventional methods. For example, the end product 1108 is a waveguide, and the process may avoid a need to post anneal a flat polymer waveguide substrate over a curved solid surface to create a specific curvature. The additional post annealing step may be more time consuming, less reliable, and more expensive.

In some embodiments, a system (e.g., a MR system described herein) includes a wearable head device (e.g., a MR device, a wearable head device described herein) comprising a display. In some embodiments, the display includes an optical stack that comprises an optical feature (e.g., end product 1108 including pattern 1110 and/or pattern 1112), and the optical feature is formed using a process or method described with respect to FIGS. 6-12. In some embodiments, the system includes one or more processors configured to execute a method that comprises presenting, on the display, content associated with a mixed reality environment, wherein the content is presented based on the optical feature.

Figure 12:
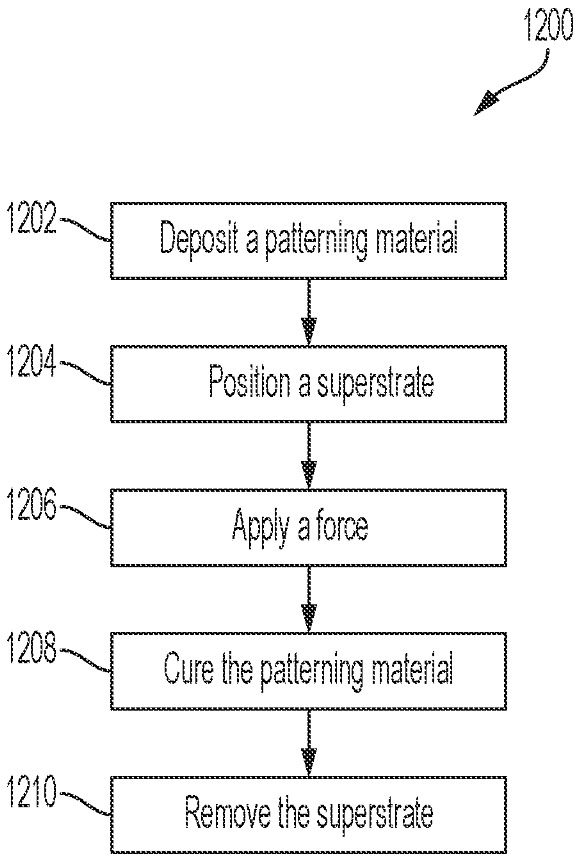
FIG. 12 illustrates an exemplary method of fabricating patterns on a curved surface, according to embodiments, of the disclosure.

FIG. 12 illustrates an exemplary method 1200 of fabricating patterns on a curved surface, according to embodiments, of the disclosure. Although the method 1200 is illustrated as including the described steps, it is understood that different order of steps, additional steps, or fewer steps may be included without departing from the scope of the disclosure. For brevity, some advantages and patterns described with respect to FIGS. 5-11 are not described here.

In some embodiments, the method 1200 includes depositing a patterning material on a curved surface (step 1202). For example, as described with respect to FIGS. 7A-7F, 8A-8C, and 10A-10C, a patterning material (e.g., patterning material 702, 802, 822A, 822B, 842A, 844B, 1002) is deposited on a curved surface. In some embodiments, depositing the patterning material on the curved surface comprises inkjetting the patterning material. For example, as described with respect to FIGS. 7A-7F, 8A-8C, and 10A-10C, the patterning material (e.g., patterning material 702, 802, 822A, 822B, 842A, 844B, 1002) is deposited on curved surface using inkjetting.

In some embodiments, the curved surface comprises one or more nano-channel arrangements. For example, as described with respect to FIGS. 6B-6D, 7A-7F, 8A-8C, and 10A-10C, a disclosed curved surface comprises one or more nano-channel arrangements. In some embodiments, the method 1200 includes spreading the patterning material over the nano-channel arrangements. For example, as described with respect to FIGS. 6B-6D, 7A-7F, 8A-8C, and 10A-10C, the one or more nano-channel arrangements on the curved surface facilitate spreading of the patterning material.

In some embodiments, each of the one or more nano-channel arrangements is arranged at an angle of zero degree, twelve degrees, or twenty-two degrees relative to an edge of the curved surface. For example, as described with respect to FIGS. 6B-6D, 7A-7F, 8A-8C, and 10A-10C, the one or more nano-channel arrangements (e.g., nano-channel arrangements 614, 624, 634) is arranged at an angle of zero degree, twelve degrees, or twenty-two degrees relative to an edge of the curved surface.

In some embodiments, the method 1200 includes positioning a superstrate over the patterning material (step 1204). In some embodiments, the superstrate comprises a template for creating a pattern. For example, as described with respect to FIGS. 7A-7F, 8A-8C, 9, and 10A-10C, a superstrate (e.g., superstrate 704, 804, 824, 844, 910) is positioned over a patterning material.

In some embodiments, the superstrate comprises a flexible coated resist template. For example, as described with respect to FIGS. 7A-7F, 8A-8C, 9, and 10A-10C, the superstrate (e.g., superstrate 704, 804, 824, 844, 910) comprises a flexible CRT. In some embodiments, the superstrate comprises Polycarbonate. For example, as described with respect to FIGS. 7A-7F, 8A-8C, 9, and 10A-10C, the superstrate (e.g., superstrate 704, 804, 824, 844, 910) comprises PC, PET, or both. In some embodiments, the superstrate has a thickness of 50-550 μm. For example, as described with respect to FIGS. 7A-7F, 8A-8C, 9, and 10A-10C, the superstrate (e.g., superstrate 704, 804, 824, 844, 910) has a thickness of 50-550 μm. In some embodiments, the superstrate has an elastic modulus E that is less than 10 GPa (e.g., at a thickness of 50-550 μm). For example, as described with respect to FIGS. 7A-7F, 8A-8C, 9, and 10A-10C, the superstrate (e.g., superstrate 704, 804, 824, 844, 910) an elastic modulus E that is less than 10 GPa.

In some embodiments, positioning the superstrate over the patterning material comprises applying a force on the superstrate to bend the superstrate toward the curved surface. For example, as described with respect to FIGS. 7A-7F, 8A-8C, 9, and 10A-10C, a force is applied on the superstrate (e.g., superstrate 704, 804, 824, 844, 910) to bend the superstrate toward a curved surface.

In some embodiments, the force on the superstrate is applied using a roller or a mechanism. For example, as described with respect to FIGS. 7A-7F, 8A-8C, 9, and 10A-10C, the force is applied on the superstrate (e.g., superstrate 704, 804, 824, 844, 910) using a roller (e.g., roller 900A, 900B) or a mechanism (e.g., mechanism 902A, 902B).

In some embodiments, the force on the superstrate maintains a distance between the superstrate and the curved surface, and the distance corresponds to the applied force. For example, as described with respect to FIGS. 7A-7F, 8A-8C, 9, and 10A-10C, the force is applied on the superstrate (e.g., superstrate 704, 804, 824, 844, 910) maintains a distance between the superstrate and a curved surface, and a applied capillary force (e.g., as described with respect to Table 1) relates to the distance.

In some embodiments, the method 1200 includes applying, using the patterning material, a force between the curved surface and the superstrate (step 1206). In some embodiments, the force comprises a capillary force. For example, as described with respect to FIGS. 7A-7F, 8A-8C, and 10A-10C, a capillary force (as described with respect to Table 1) is applied between a curved surface and a superstrate. The force may be a sufficient force for reliably creating a pattern using the patterning material and the template of the superstrate.

In some embodiments, the force is based on a thickness of the patterning material, a contact angle of patterning material, or both. For example, as described with respect to FIGS. 7A-7F, 8A-8C, and 10A-10C and Table 1, a magnitude of capillary force applied between a curved surface and a superstrate is a function of a thickness of the patterning material, a contact angle of the patterning material, or both. In some embodiments, the force maintains a position of the applied superstrate relative to the curved surface. For example, the capillary force maintains the distance between the superstrate and the curved surface without the force applied on the superstrate.

In some embodiments, the method 1200 includes ceasing applying the force on the superstrate after the force between the curved surface and the superstrate is applied. For example, as described with respect to FIGS. 7A-7F, 8A-8C, 9, and 10A-10C, after a desired capillary force is applied between the superstrate and the curved surface, the capillary force may maintain the distance between the superstrate and the curved surface without the force applied on the superstrate; application of the force on the superstrate may be ceased.

In some embodiments, the method 1200 includes curing the patterning material (step 1208). In some embodiments, the cured patterning material comprises the pattern. For example, as described with respect to FIGS. 7A-7F, 8A-8C, 10A-10C, and 11A-11D, the patterning material is cured (e.g., using UV light), and the cured patterning material comprises a pattern (e.g., pattern 706, 810, 812, 830, 832, 850, 852, 1006, 1102, 1104) from the template of the superstrate.

In some embodiments, the method 1200 includes removing the superstrate (step 1210). For example, as described with respect to FIGS. 7A-7F, 8A-8C, 10A-10C, and 11A-11D, after a pattern (e.g., pattern 706, 810, 812, 830, 832, 850, 852, 1006, 1102, 1104) is created, the superstrated is removed. In some embodiments, the method 1200 includes bonding the patterning material with the curved surface via a covalent bond. For example, to increase bonding strength between the patterning material and the curved surface and reduce potential damage to the pattern during superstrate removal, the patterning material is bonded to the curved surface via a covalent bond.

In some embodiments, the method 1200 includes forming an optical structure using the pattern. For example, as described with respect to FIG. 11A-11D, end product 1108 is formed using the patterns 1102 and 1104. In some embodiments, the optical structure is formed by using the pattern to mold a curable resin. For example, as described with respect to FIG. 11A-11D, the end product 1108 is formed by molding the material 1106 (e.g., a curable resin). In some embodiments, the end product 1108 comprises a molded polymer.

In some embodiments, the optical structure comprises a curved waveguide. For example, as described with respect to FIG. 11A-11D, the end product 1108 comprises a curved waveguide. In some embodiments, the pattern corresponds to a focal point of the curved waveguide. For example, as described with respect to FIG. 11A-11D, the curved waveguide comprises optical patterns 1110 and 1112 formed by patterns 1102 and 1104, and the optical patterns correspond to the focal point 1114 for displaying MR content.

In some embodiments, the optical structure comprises a lens having an antireflective feature corresponding to the pattern. For example, as described with respect to FIG. 11A-11D, the end product 1108 comprises a lens having an antireflective feature formed by the patterns 1102 and/or 1104.

In some embodiments, the method 1200 includes coating the pattern with a release layer. For example, as described with respect to FIGS. 7A-7F, 8A-8C, 10A-10C, and 11A-11D, after a pattern (e.g., pattern 706, 810, 812, 830, 832, 850, 852, 1006, 1102, 1104) is created, the pattern is coated with a release layer to facilitate release of an end product (e.g., end product 1108) molded by the pattern (e.g., pattern 1102 of mold 1100A, pattern 1104 of mold 1100B).

In some embodiments, the first patterning material has a first volume, and the first patterning material is deposited at a first location with respect to the curved surface. In some embodiments, the method 1200 includes depositing a second patterning material having a second volume at a second location with respect to the curved surface. In some embodiments, a first thickness of the first patterning material at the first location corresponds to a thickness of the first volume, and a second thickness of the second patterning material at the second location corresponds to a thickness of the second volume. For example, as described with respect to FIG. 8A, the patterns 810 and 812 are formed due to varying pattern material 802 deposition volume.

In some embodiments, the first patterning material comprises a first material, and the first patterning material is deposited at a first location with respect to the curved surface. In some embodiments, the method 1200 includes depositing a second patterning material comprising a second material at a second location with respect to the curved surface. In some embodiments, a first thickness of the first patterning material at the first location corresponds to a property of the first material, and a second thickness of the second patterning material at the second location corresponds to a property of the second material. For example, as described with respect to FIG. 8B, the pattern 830 is formed based on patterning material 822A, and the pattern 832 is formed based on patterning material 822B. A property of the patterning material 822A causes the patterning material 822A to spread in a first manner. Due to spreading of the patterning material 822A, a first thickness 826 results, and a first capillary force is applied based on the first thickness 826. A property of the patterning material 822B causes the patterning material 822B to spread in a second manner. Due to spreading of the patterning material 822B, a second thickness 828 results, and a second capillary force is applied based on the second thickness 828.

In some embodiments, the first patterning material is deposited at a plurality of first locations of the curved surface, the first locations separated by first intervals, and the cured patterning material further comprises a second pattern. In some embodiments, the method 1200 includes depositing a second patterning material at a plurality of second locations of the curved surface, the second locations separated by second intervals. In some embodiments, the first intervals correspond to a first thickness for applying the first force for creating the first pattern, and the second intervals correspond to a second thickness for applying a second force for creating the second pattern. For example, as described with respect to FIG. 8C, the patterning material 842A is deposited on first locations of the curved surface separated by first intervals, and the patterning material 842B is deposited on second locations of the curved surface by second intervals. The first intervals correspond to the first thickness 846 for applying a first force for creating the first pattern 850, and the second intervals correspond to second thickness 848 for applying a second force for creating the second pattern 852.

According to some embodiments, a method comprises: depositing a patterning material on a curved surface; positioning a superstrate over the patterning material, the superstrate comprising a template for creating a pattern; applying, using the patterning material, a force between the curved surface and the superstrate; curing the patterning material, wherein the cured patterning material comprises the pattern; and removing the superstrate.

According to some embodiments, the method further comprises forming an optical structure using the pattern.

According to some embodiments, the optical structure is formed by using the pattern to mold a curable resin.

According to some embodiments, the optical structure comprises a curved waveguide.

According to some embodiments, the pattern corresponds to a focal point of the curved waveguide.

According to some embodiments, the optical structure comprises a lens having an antireflective feature corresponding to the pattern.

According to some embodiments, the curved surface comprises one or more nano-channel arrangements.

According to some embodiments, each of the one or more nano-channel arrangements is arranged at an angle of zero degree, twelve degrees, or twenty-two degrees relative to an edge of the curved surface.

According to some embodiments, the method further comprises spreading the patterning material over the nano-channel arrangements.

According to some embodiments, the force comprises a capillary force.

According to some embodiments, the force is based on a thickness of the patterning material, a contact angle of patterning material, or both.

According to some embodiments, the force maintains a position of the applied superstrate relative to the curved surface.

According to some embodiments, depositing the patterning material on the curved surface comprises inkjetting the patterning material.

According to some embodiments, positioning the superstrate over the patterning material comprises applying a force on the superstrate to bend the superstrate toward the curved surface.

According to some embodiments, the force on the superstrate is applied using a roller or a mechanism.

According to some embodiments, the force on the superstrate maintains a distance between the superstrate and the curved surface, and the distance corresponds to the applied force.

According to some embodiments, the method further comprises ceasing applying the force on the superstrate after the force between the curved surface and the superstrate is applied using the patterning material.

According to some embodiments, the superstrate comprises a flexible coated resist template.

According to some embodiments, the superstrate comprises PC, polyethylene terephthalate, or both.

According to some embodiments, the superstrate has a thickness of 50-550 μm.

According to some embodiments, the superstrate has an elastic modulus less than 10 GPa.

According to some embodiments, the method further comprises coating the pattern with a release layer.

According to some embodiments, the method further comprises bonding the patterning material with the curved surface via a covalent bond.

According to some embodiments, the first patterning material has a first volume, and the first patterning material is deposited at a first location with respect to the curved surface.

The method further comprises depositing a second patterning material having a second volume at a second location with respect to the curved surface. A first thickness of the first patterning material at the first location corresponds to a thickness of the first volume, and a second thickness of the second patterning material at the second location corresponds to a thickness of the second volume.

According to some embodiments, the first patterning material comprises a first material, and the first patterning material is deposited at a first location with respect to the curved surface. The method further comprises depositing a second patterning material comprising a second material at a second location with respect to the curved surface. A first thickness of the first patterning material at the first location corresponds to a property of the first material, and a second thickness of the second patterning material at the second location corresponds to a property of the second material.

According to some embodiments, the first patterning material is deposited at a plurality of first locations of the curved surface, the first locations separated by first intervals, and the cured patterning material further comprises a second pattern. The method further comprises depositing a second patterning material at a plurality of second locations of the curved surface, the second locations separated by second intervals. The first intervals correspond to a first thickness for applying the first force for creating the first pattern, and the second intervals correspond to a second thickness for applying a second force for creating the second pattern.

According to some embodiments, the method further comprises transferring, via etching, the pattern onto the curved surface.

According to some embodiments, an optical stack comprises an optical feature. The optical feature is formed using any of the above methods.

According to some embodiments, a system comprises: a wearable head device comprising a display. The display comprises an optical stack comprising an optical feature, and the optical feature is formed using any of the above methods; and one or more processors configured to execute a method comprising: presenting, on the display, content associated with a mixed reality environment, wherein the content is presented based on the optical feature.

Although the disclosed examples have been fully described with reference to the accompanying drawings, it is to be noted that various changes and modifications will become apparent to those skilled in the art. For example, elements of one or more implementations may be combined, deleted, modified, or supplemented to form further implementations. Such changes and modifications are to be understood as being included within the scope of the disclosed examples as defined by the appended claims.

What is claimed is:

1. A method, comprising:

depositing a first patterning material on a curved surface, wherein the first patterning material has a first volume and is deposited at a first location with respect to the curved surface;

depositing a second patterning material having a second volume at a second location with respect to the curved surface, wherein a first thickness of the first patterning material at the first location corresponds to a size of the first volume and a second thickness of the second patterning material at the second location corresponds to a size of the second volume;

positioning a superstrate over the first and second patterning materials, the superstrate comprising a template associated with a pattern;

applying, using the first and second patterning materials, a force between the curved surface and the superstrate;

curing the first and second patterning materials, said curing resulting in a cured patterning material comprising the pattern; and removing the superstrate.

2. The method of claim 1, further comprising forming an optical structure using the pattern.

3. The method of claim 1, wherein the curved surface comprises one or more nano-channel arrangements.

4. The method of claim 1, wherein the force comprises a capillary force.

5. The method of claim 4, wherein the capillary force is different between the first and the second patterning materials, where the capillary force for each the first and second patterning materials is based on one or more of a thickness of the patterning material and a contact angle of the patterning material.

6. The method of claim 1, wherein the force maintains a position of the applied superstrate relative to the curved surface.

7. The method of claim 1, wherein depositing the first patterning material and depositing the second patterning material on the curved surface comprises inkjetting the each of the first and second patterning materials.

8. The method of claim 1, wherein positioning the superstrate over the first and second patterning materials comprises applying a force on the superstrate to bend the superstrate toward the curved surface.

9. The method of claim 1, wherein the superstrate comprises a flexible coated resist template.

10. The method of claim 1, wherein the superstrate comprises a superstrate material selected from the group consisting of polycarbonate, polyethylene terephthalate, and combinations thereof.

11. The method of claim 1, wherein the superstrate has a thickness of 50-550 μm.

12. The method of claim 1, wherein the superstrate has an elastic modulus less than 10 GPa.

13. The method of claim 1, further comprising coating the pattern with a release layer.

14. The method of claim 1, further comprising bonding the first and second patterning materials with the curved surface via a covalent bond.

15. The method of claim 1, further comprising transferring, via etching, the pattern onto the curved surface.

16. A method, comprising:

depositing a first patterning material on a curved surface, wherein the first patterning material comprises a first material and is deposited at a first location with respect to the curved surface;

depositing a second patterning material comprising a second material at a second location with respect to the curved surface;

positioning a superstrate over the first and second patterning materials, the superstrate comprising a template associated with a pattern;

applying, using the first and second patterning materials, a force between the curved surface and the superstrate;

curing the first patterning material, said curing resulting in a cured patterning material comprising the pattern; and removing the superstrate, wherein:

a first thickness of the first patterning material at the first location corresponds to a wetting characteristic of the first material, and a second thickness of the second patterning material at the second location corresponds to a wetting characteristic of the second material.

17. A method, comprising:

depositing a first patterning material on a curved surface, wherein the first patterning material is deposited at a plurality of first locations of the curved surface, the first locations separated by first intervals, depositing a second patterning material at a plurality of second locations of the curved surface, the second locations separated by second intervals;

positioning a superstrate over the first and second patterning materials, the superstrate comprising a template associated with a first pattern and a second pattern;

applying, using the first and second patterning materials, respective first and second forces between the curved surface and the superstrate;

curing the first and second patterning material, said curing resulting in a cured patterning material comprising the first pattern and the second pattern; and removing the superstrate, wherein:

the first intervals correspond to a first thickness for applying the first force for creating the first pattern, and the second intervals correspond to a second thickness for applying a second force for creating the second pattern.

* * * * *